US009457899B2

(12) United States Patent
Duffy et al.

(10) Patent No.: US 9,457,899 B2
(45) Date of Patent: Oct. 4, 2016

(54) MODULAR VEHICLE LIFT SYSTEM

(71) Applicant: The Boeing Company, Chicago, IL (US)

(72) Inventors: Michael J. Duffy, Prospect Park, PA (US); Scott H. Bouwer, Wilmington, DE (US); John J. Mattero, Media, PA (US)

(73) Assignee: The Boeing Company, Chicago, IL (US)

( * ) Notice: Subject to any disclaimer, the term of this patent is extended or adjusted under 35 U.S.C. 154(b) by 68 days.

(21) Appl. No.: 13/925,305

(22) Filed: Jun. 24, 2013

(65) Prior Publication Data

US 2014/0374532 A1 Dec. 25, 2014

(51) Int. Cl.
*G01C 23/00* (2006.01)
*B64C 37/02* (2006.01)
*B64C 39/02* (2006.01)

(52) U.S. Cl.
CPC ............. *B64C 37/02* (2013.01); *B64C 39/024* (2013.01); *B64C 2201/027* (2013.01); *B64C 2201/108* (2013.01); *B64C 2201/128* (2013.01); *B64C 2201/146* (2013.01)

(58) Field of Classification Search
None
See application file for complete search history.

(56) References Cited

U.S. PATENT DOCUMENTS

| | | | | |
|---|---|---|---|---|
| 3,013,743 A * | 12/1961 | Keeney | | 244/3 |
| 3,332,643 A * | 7/1967 | Toner | | 244/7 R |
| 3,656,723 A * | 4/1972 | Piasecki et al. | | 244/2 |
| 3,743,214 A * | 7/1973 | Maciolek | | 244/2 |
| 4,591,112 A * | 5/1986 | Piasecki et al. | | 244/26 |
| 4,601,444 A * | 7/1986 | Lindenbaum | | 244/26 |
| 5,082,205 A * | 1/1992 | Caufman | | 244/25 |
| 7,357,352 B2 * | 4/2008 | Speer et al. | | 244/2 |
| 7,699,260 B2 * | 4/2010 | Hughey | | 244/17.23 |
| 7,959,104 B2 * | 6/2011 | Kuntz | | 244/2 |
| 8,322,648 B2 * | 12/2012 | Kroetsch et al. | | 244/17.23 |
| 8,886,371 B2 * | 11/2014 | Peters | | 701/13 |
| 2006/0198713 A1 * | 9/2006 | Azzalin et al. | | 411/8 |
| 2007/0023581 A1 * | 2/2007 | La | | 244/165 |
| 2007/0102565 A1 * | 5/2007 | Speer et al. | | 244/2 |
| 2009/0194634 A1 * | 8/2009 | Stelte | | 244/1 R |
| 2009/0250549 A1 * | 10/2009 | Wiggerich | | 244/17.11 |
| 2009/0283629 A1 * | 11/2009 | Kroetsch et al. | | 244/17.23 |

(Continued)

FOREIGN PATENT DOCUMENTS

GB 2 455 374 6/2009
WO WO 2008/018857 2/2008

OTHER PUBLICATIONS

Extended European Search Report dated Oct. 30, 2014 from European Application No. 14167622.1.

(Continued)

*Primary Examiner* — Medhat Badawi
(74) *Attorney, Agent, or Firm* — Baldauff IP, LLC; Michael J. Baldauff, Jr.

(57) ABSTRACT

Apparatus, systems, and methods provide for a modular vehicle system utilized for lifting and maneuvering payloads. According to aspects of the disclosure, any number of individual lift vehicles may be connected to create a unified lift vehicle. The individual lift vehicles may be placed adjacent to one another according to a determined lifting array formation and coupled together using connection mechanisms. The connection mechanisms rigidly and communicatively connect the individual lift vehicles to create the unified lift vehicle suitable for lifting and maneuvering a payload.

23 Claims, 27 Drawing Sheets

(56) References Cited

U.S. PATENT DOCUMENTS

| | | | |
|---|---|---|---|
| 2010/0193625 A1* | 8/2010 | Sommer | 244/2 |
| 2010/0193651 A1* | 8/2010 | Railsback et al. | 248/229.24 |
| 2011/0144834 A1* | 6/2011 | Sommer | 701/3 |
| 2011/0202205 A1* | 8/2011 | Pepitone et al. | 701/3 |
| 2012/0048990 A1* | 3/2012 | Sommer | 244/3 |
| 2012/0056040 A1* | 3/2012 | Brotherton-Ratcliffe et al. | 244/23 A |
| 2012/0132744 A1* | 5/2012 | Huber et al. | 244/118.1 |
| 2012/0158215 A1* | 6/2012 | Sun et al. | 701/3 |
| 2013/0105635 A1* | 5/2013 | Alzu'bi et al. | 244/23 A |
| 2013/0110325 A1* | 5/2013 | Sapp et al. | 701/3 |
| 2014/0025238 A1* | 1/2014 | So et al. | 701/3 |
| 2014/0371956 A1* | 12/2014 | Jenkins | 701/3 |
| 2014/0374532 A1* | 12/2014 | Duffy et al. | 244/2 |

OTHER PUBLICATIONS

Mellinger, Daniel, Shomin, Michael, Michael, Nathan and Kumar, Vijay, "Cooperative Grasping and Transport Using Multiple Quadrotors", GRASP Laboratory, University of Pennsylvania, Philadelphia, PA, Nov. 2010, pp. 1-12.

e-volvo; http://www.e-volo.com , dated Feb. 14, 2013, pp. 1-2.

* cited by examiner

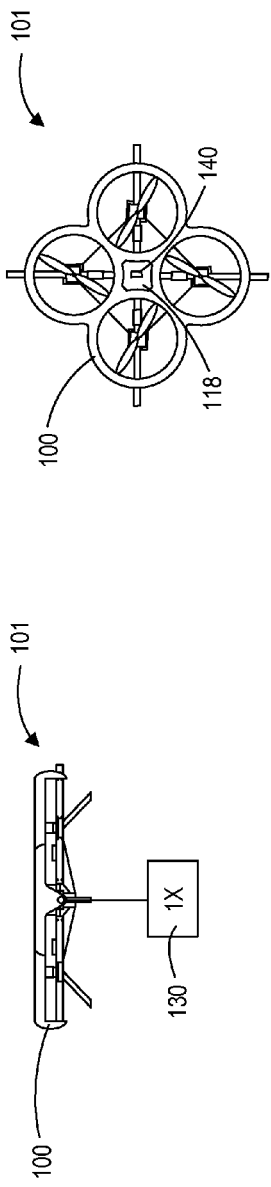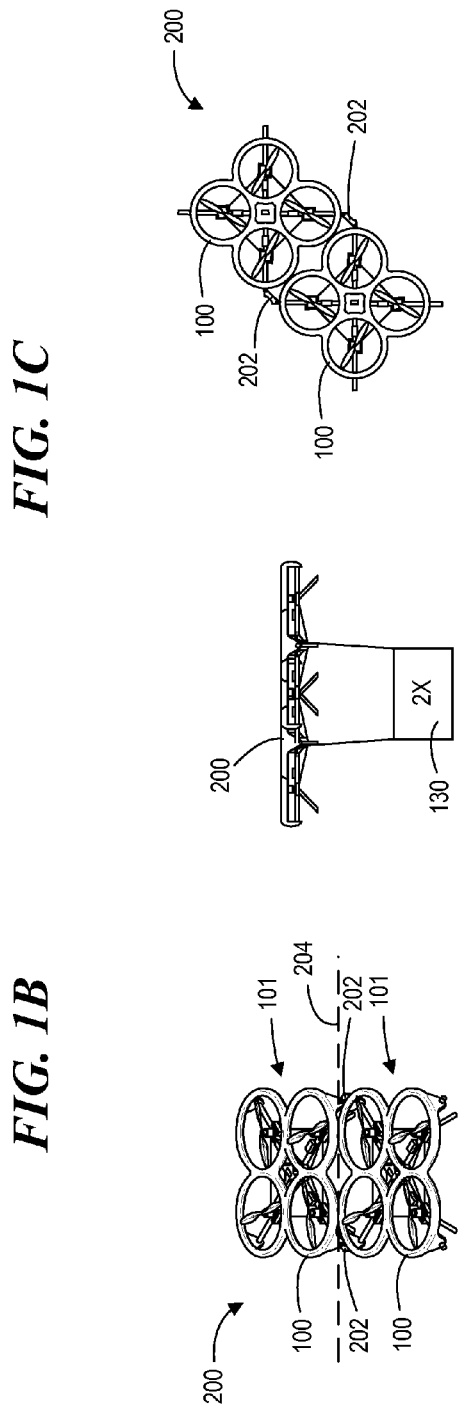

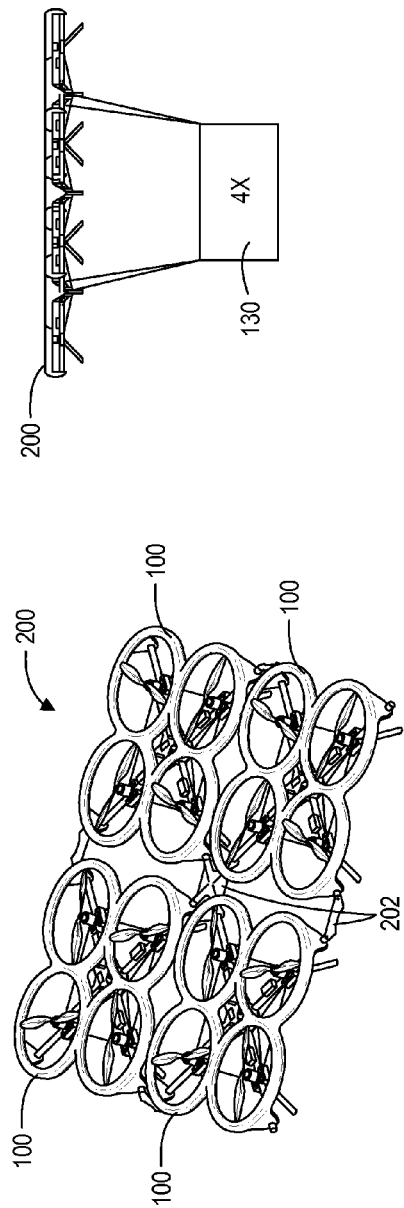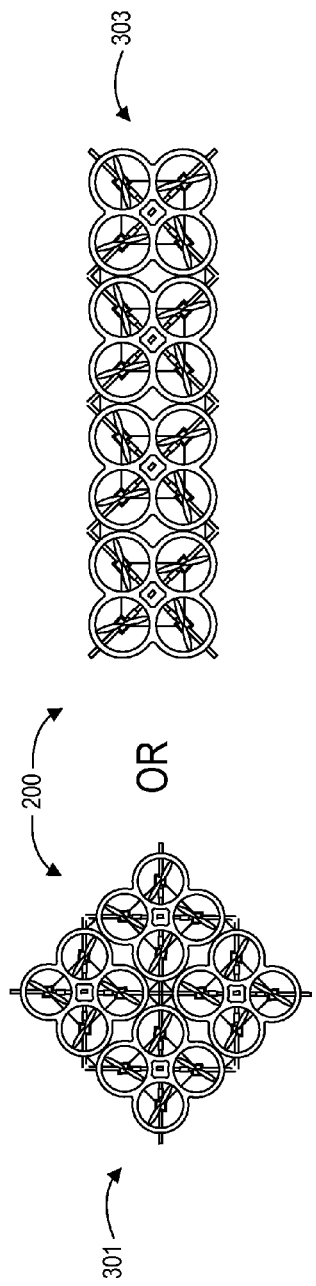
*FIG. 3A*
*FIG. 3B*
*FIG. 3C*

MODULAR VEHICLE LIFT SYSTEM

BACKGROUND

Helicopters are commonly used to lift payloads and transport them from one location to another. Remotely piloted lift vehicles may also be used to vertically lift a payload in a similar manner as conventional helicopters while being controlled by one or more operators that are not within the vehicle. With respect to helicopters and remotely piloted lift vehicles (generally referred to as "lift vehicles"), the weight of the payload is limited by the capabilities of the corresponding lift vehicle.

In a typical scenario in which a payload larger than the capacity of the lift vehicle is to be lifted, the entire payload may be divided or reconfigured into multiple payload portions, each being a size and weight that is within the safe allowable lifting capacity of the lift vehicle to be used during the operation. In doing so, the lift vehicle makes multiple trips to lift and move all of the payload portions from point A to point B until the entire payload has been moved. By dividing the payload into multiple portions, the cost and risk associated with the operation is increased, potentially significantly, due to the increased amount of time involved with making multiple flights between points A and B.

Alternatively, when the payload cannot be reconfigured or divided into multiple portions, multiple lift vehicles may be coupled to the entire payload to increase the lifting capabilities as compared to a single lift vehicle. When utilizing multiple lift vehicles to lift a payload, traditional lifting configurations include at least one pilot or remote operator per lift vehicle, with each vehicle operating independently, but in coordination with, other vehicles to maneuver the payload. This lifting configuration requires skilled pilots or remote operators. Moreover, the cost and risk associated with the operation may be significant due to the use of multiple vehicles and corresponding operators, as well as the risk associated with coordinated operation of multiple lift vehicles that are in close proximity to one another and are coupled to a single payload.

A straightforward approach to moving a payload is to select and utilize a lift vehicle that is capable of lifting and transporting the entire payload in one flight. Doing so may reduce the cost and risk associated with multiple flights or multiple vehicles, but may not be feasible due to availability of a lift vehicle capable with handling the entire payload, cost associated with acquiring a capable lift vehicle, environmental or operational considerations that prevent the use of the capable lift vehicle, or other considerations.

One conventional approach to ensuring a capability to lift large payloads may be to maintain a lift vehicle having the capacity to lift large payloads that may be encountered in a particular business or industry. A problem with doing so is that the cost of maintaining the lift vehicle with significant capacity may be substantial. If the lift vehicle is used to lift smaller payloads in addition to the large payloads, then a cost penalty is incurred in using the oversized lift vehicle for the mission.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus, systems, and methods described herein provide for a modular vehicle lift system that may be configured according to the particular lift mission and controlled autonomously and remotely. According to one aspect, a unified lift vehicle is provided for maneuvering a payload. The unified lift vehicle may include a number of individual lift vehicles and a number of connection mechanisms. The individual lift vehicles are each operative to perform controlled three-axis flight. They may be positioned adjacent to one another according to a lifting array formation and connected via the connection mechanisms. The connection mechanisms may rigidly and communicatively connect the individual lift vehicles in the lifting array formation to create the unified lifting vehicle. The unified lift vehicle may be operative to perform three-axis flight to lift and maneuver the payload.

According to another aspect, a modular vehicle lift system may include a number of individual lift vehicles, connection mechanisms, and a remote control device. The individual lift vehicles may each include four drive units and a controller. The four drive units may be coupled to one another to create a four-rotor configuration, with each drive unit including a motor and an attached rotor. The controller may be in communication with the four drive units and operable to control the four drive units according to control data received from the remote control device. The connection mechanisms may rigidly and communicatively connect the individual lift vehicles in the lifting array formation to create the unified lifting vehicle. The unified lift vehicle may be operative to perform three-axis flight to lift and maneuver the payload in response to input from the remote control device via the controller.

According to yet another aspect, a method for maneuvering a payload utilizing a modular vehicle lift system may include rigidly and communicatively coupling a number of individual lift vehicles that are each operative to perform three-axis flight. The individual lift vehicles may be coupled together using connection mechanisms to create a unified lift vehicle. The payload may be coupled to the unified lift vehicle and flight commands provided to maneuver the unified lift vehicle and payload in three-axis flight.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 1A-1C are perspective, side, and top views, respectively, of an individual lift vehicle utilizing a four-rotor configuration according to various embodiments presented herein;

FIGS. 2A-2C are perspective, side, and top views, respectively, of a unified lift vehicle comprised of two individual lift vehicles according to various embodiments presented herein;

FIGS. 3A-3C are perspective, side, and top views, respectively, of a unified lift vehicle comprised of four individual lift vehicles according to various embodiments presented herein;

DETAILED DESCRIPTION

Figure 1A:
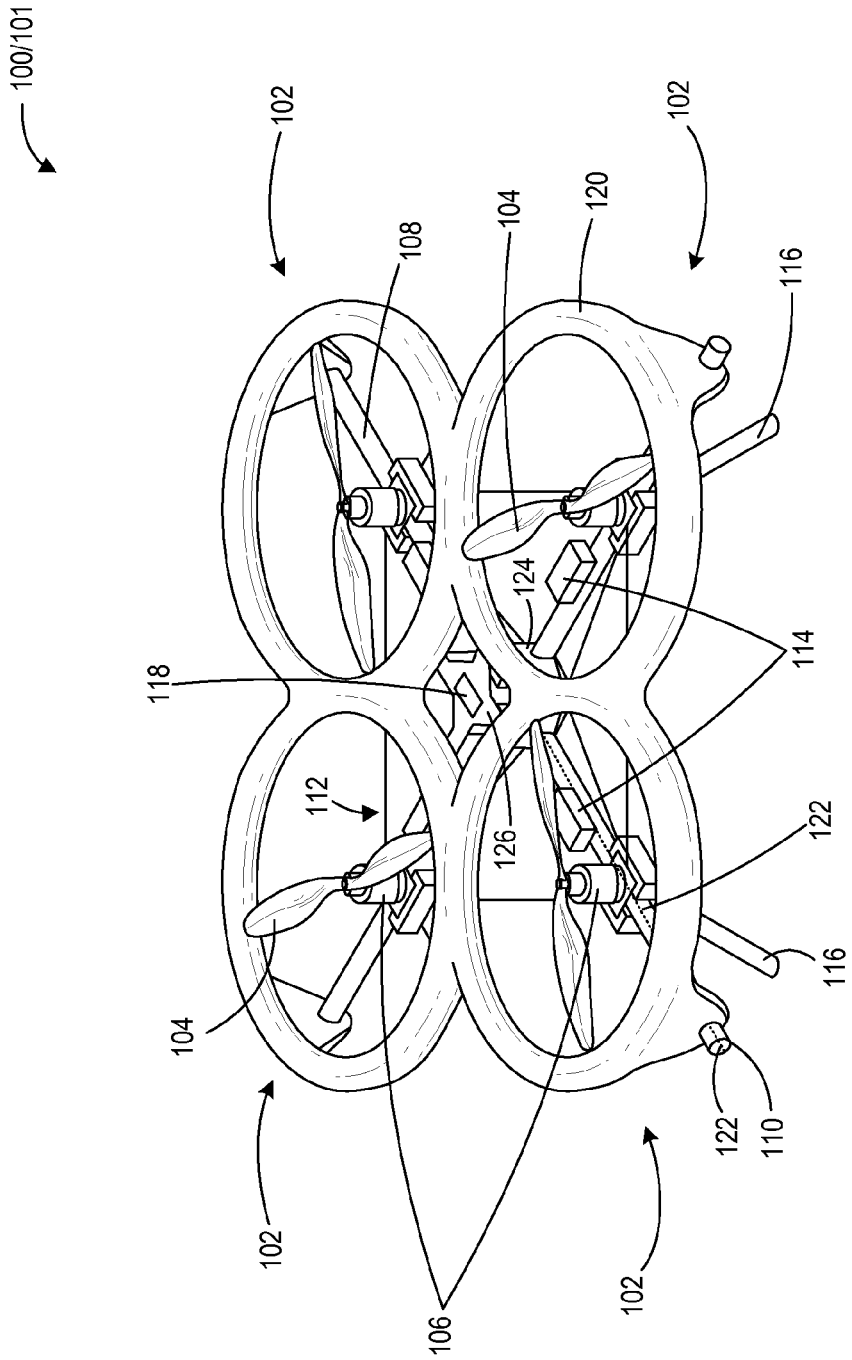

The following detailed description is directed to a modular lift system and method that utilizes any number of individual lift vehicles coupled together to provide a remotely or autonomously controlled unified lift vehicle according to the payload being lifted and other appropriate characteristics of the mission. As discussed above, traditional helicopters and other lift vehicles are limited to lifting and maneuvering a payload having a size and weight that falls within the safe operating parameters associated with the particular lift vehicle. If a lift vehicle with an adequate payload capacity is not available, the mission may not be possible. Alternatively, to maneuver payloads outside of the capabilities of the lift vehicle, a different lift vehicle may be acquired, or if possible, the payload may be apportioned into smaller sections that are capable of being maneuvered by the lift vehicle in multiple lift operations. These options may significantly increase the time and cost associated with the lift mission.

Another option may be to utilize multiple lift vehicles that are independently coupled to the payload to spread the weight of the payload amongst the multiple lift vehicles. This option may not only increase the cost of the operation, but the risk of the lift operation significantly increases. The pilots or operators of each lift vehicle must coordinate their actions to not only lift the payload, but to work with the others to successfully maneuver the payload while maintaining safe separation from other lift vehicles.

Utilizing the concepts and technologies described herein, a modular vehicle lift system utilizes a number of individual lift vehicles that may be rigidly connected together in an appropriate formation and remotely operated as a single, unified lift vehicle to lift and maneuver a payload. Embodiments encompass an individual lift vehicle that includes a number of rotors and a control system that enables the individual lift vehicle to be remotely controlled to lift and maneuver a payload according to the lifting capabilities of the vehicle. Depending on the characteristics of the payload to be lifted, as well as criteria specific to the particular lift mission for delivering the payload, the appropriate number of individual lift vehicles and the formation in which the individual lift vehicles are to be attached to one another may be determined. The determined number of individual lift vehicles may then be rigidly and communicatively attached to one another in the determined formation via connection mechanisms to create a unified lift vehicle. The unified lift vehicle may then be controlled by a single operator via a remote control device to lift the payload and deliver the payload to a desired location. The operation may be manually controlled by the operator throughout the mission, may be autonomously controlled via a programmed control system, or a combination of manual and autonomous control depending on the particular portion of the lift mission or according to user preference.

In the following detailed description, references are made to the accompanying drawings that form a part hereof, and which are shown by way of illustration, specific embodiments, or examples. Referring now to the drawings, in which like numerals represent like elements through the several figures, a modular vehicle lift system and method for employing the same according to the various embodiments will be described.

FIGS. 1A-1C show perspective, side, and top views, respectively, of an individual lift vehicle 100 having a four-rotor configuration 101 according to various embodiments. For the purposes of this disclosure, an individual lift vehicle 100 may be considered to be the base, or core, unit of a unified lift vehicle described below. According to various embodiments, an individual lift vehicle 100 may be a remote controlled rotor-based aircraft or drone. The individual lift vehicle 100 may be controlled remotely by a user to perform a lift mission according to the lift capabilities of the individual lift vehicle 100. In other words, a single individual lift vehicle 100, such as the individual lift vehicle 100 shown in FIGS. 1A-1C, may be used to lift a payload 130 up to a weight that the individual lift vehicle 100 is safely capable of lifting and maneuvering. The precise lift capabilities of the individual lift vehicle 100 and the corresponding weight that it is able to lift is dependent upon a number of factors, including but not limited to, the weight of the individual lift vehicle 100 and thrust that the individual lift vehicle 100 is able to produce, as well as whether redundancy is provided in order to account for rotor failure. For comparative purposes when later discussing the benefits of coupling individual lift vehicles 100 together, the payload 130 shown in FIG. 1B is marked "1×" to indicate a payload 130 of weight "X," multiplied by a factor of 1 in this example.

Each individual lift vehicle 100 may be operative to perform controlled three-axis flight when not connected to other individual lift vehicles 100 as described below. For the purposes of this disclosure, being operative to perform controlled three-axis flight may include responding to remote control input to maneuver in three dimensions or along three axes. So, a remote pilot may provide input that causes the individual lift vehicle 100 to fly up, down, forward, back, and side to side, as well as fluidly to and between these directions.

The individual lift vehicle 100 of the example shown in FIG. 1 is arranged in a four-rotor configuration 101, which includes four drive units 102 with corresponding rotors 104. The drive units 102 are arranged in substantially a square pattern, or in a two-by-two array. As will be described in greater detail below with respect to FIGS. 7-14, additional configurations are contemplated. It should be appreciated that an individual lift vehicle 100 having any number of drive units 102 is within the scope of this disclosure.

Each drive unit 102 may include a rotor 104 coupled to a motor 106. A power source 124 may include a battery stored within a hub 126 or other portion of the individual lift vehicle 100. Power may be routed from the power source 124 to each individual motor 106 via distribution lines 122, or alternatively, each drive unit 102 may include a separate power source dedicated to that particular drive unit 102. Each motor 106 may be electrically driven and sized according to the desired performance capabilities of the individual lift vehicle 100. A speed controller 114 may be used to provide control to the motor 106 within each drive unit 102 in response to signals provided from a control and sensor suite 118, which is described in greater detail below.

The distribution lines 122 may include any type of power and/or data wires or signal transfer mechanisms suitable for transferring power or data between the drive units and the control and sensor suite 118, as well as between individual lift vehicles 100 when coupled together as described below. Power and data may be distributed through the same distribution lines 122 or through separate distribution lines 122. The distribution lines 122 are represented in FIG. 1A with a broken line through along the frame 108 of only one drive unit 102 for clarity purposes, however, it should be appreciated that the distribution lines 122 may be routed through or incorporated into any portions of the frame 108 for all drive units 102. The ends of the frame 108 of each drive unit 102 creates a connector junction 110 for securely coupling each individual lift vehicle 100 to an adjacent individual lift vehicle 100 as will be described in detail below. Also as discussed further below, the distribution lines 122 may extend to each connector junction 110 in order to provide a mechanism to allow for the transfer of power and data between individual lift vehicles 100 that are coupled together.

According to one embodiment, the frame 108 includes modular tubing manufactured from any suitable materials including, but not limited to, aluminum, carbon composites, glass composites, titanium, wood, and any combinations thereof. The modular tubing of the frame 108 is centrally secured together at the hub 126 and extends outward to create a stable mounting location for each drive unit 102. Tension wires 112 may additionally be used to provide structural support and stability to the frame 108. Each individual lift vehicle 100 may have landing gear 116 extending from the frame 108 that provide stable contact points on which the individual lift vehicle 100 rests. Moreover, protective ducts 120 may optionally be used to encircle each rotor 104 with a material that provides some protection against contact with objects or people. Suitable materials for the protective ducts 120 include, but are not limited to, aluminum, carbon composites, glass composites, titanium, Styrofoam, plastic, compressed cardboard, wood, and any combinations thereof.

According to one embodiment, the control and sensor suite 118 may include any type of sensors and components used for control of the individual lift vehicle 100. As an example, the control and sensor suite 118 may include a signal receiver for receiving remote controls from a remote control device, which is shown and described below with respect to FIGS. 22-33. Moreover, the control and sensor suite 118 may include a controller 140 operative for implementing stored or received instructions for autonomous flight from one location to another via pre-programmed waypoints according to pre-programmed flight characteristics such as altitude, velocity, climb and descent locations and rates, and the like. The control and sensor suite 118 may include an inertial measurement unit and global positioning system components to aid in navigation and flight controls. The control and sensor suite 118 may additionally include any type of sensors or feedback mechanisms corresponding to the individual lift vehicle 100 or the ambient environment. It should be understood that the present disclosure contemplates any type of sensors and components that may be beneficial to operation of the individual lift vehicle 100 and corresponding modular lift system described herein.

FIGS. 2A-2C show perspective, side, and top views, respectively, of a unified lift vehicle 200, created by coupling two individual lift vehicles 100. Utilizing the concepts described herein, a unified lift vehicle 200 may be created using any appropriate number of individual lift vehicles 100 to lift a payload 130 according to the criteria of any specific lift mission. As shown in FIGS. 2A-2C, the unified lift vehicle 200 of this example utilizes two individual lift vehicles 100 rigidly coupled together along axis 204 via connection mechanisms 202. The connection mechanisms 202 will be described in detail below with respect to FIGS. 15-20. For the purposes of this disclosure, "rigidly coupled" or "rigidly connected" means physically attached to one another via a substantially inflexible connection mechanism or means.

By rigidly coupling the individual lift vehicles 100, the unified lift vehicle 200 is created. The unified lift vehicle 200 operates as a single remotely controlled vehicle in much the same manner as the individual lift vehicles 100 operate. In other words, the individual lift vehicles 100 of the unified lift vehicle 200 work together when coupled to provide the unified lift vehicle 200 with the capability for controlled three-axis flight. In doing so, as shown in FIG. 2B, the unified lift vehicle 200 of this example that is created from coupling two individual lift vehicles 100 is capable of lifting a payload 130 having a weight of approximately "2×," or two times the weight of the payload 130 that a single individual lift vehicle 100 is capable of lifting. It should be appreciated that due to the weight associated with the connection mechanisms 202, the actual increase in payload capacity attributed to connecting two individual lift vehicles 100 together to create a unified lift vehicle 200 may be less than two times the payload capacity of a single individual lift vehicle 100.

FIGS. 3A-3C show perspective, side, and top views, respectively, of a unified lift vehicle 200, created by coupling four individual lift vehicles 100. The unified lift vehicle 200 of this example that is created from coupling four individual lift vehicles 100 is capable of lifting a payload 130 having a weight of "4×," or four times the weight of the payload 130 that a single individual lift vehicle 100 is capable of lifting. It should be clear from these examples that according to various embodiments presented herein, a unified lift vehicle 200 comprised of N number of individual lift vehicles 100 may be capable of lifting N times the weight of the payload 130 that a single individual lift vehicle 100 may lift. As seen in FIG. 3C, the unified lift vehicle 200 may be arranged according to any appropriate formation using a given number of individual lift vehicles 100. For example, 2×2 formation 301 includes four individual lift vehicles 100 positioned and secured adjacent to one another in two columns and two rows to form the unified lift vehicle 200 having a generally square or diamond shape. Alternatively, 4×1 formation 303 includes four individual lift vehicles 100 positioned and secured adjacent to one another in four columns and one row to create a unified lift vehicle 200 having a generally rectangular shape.

Figure 4:
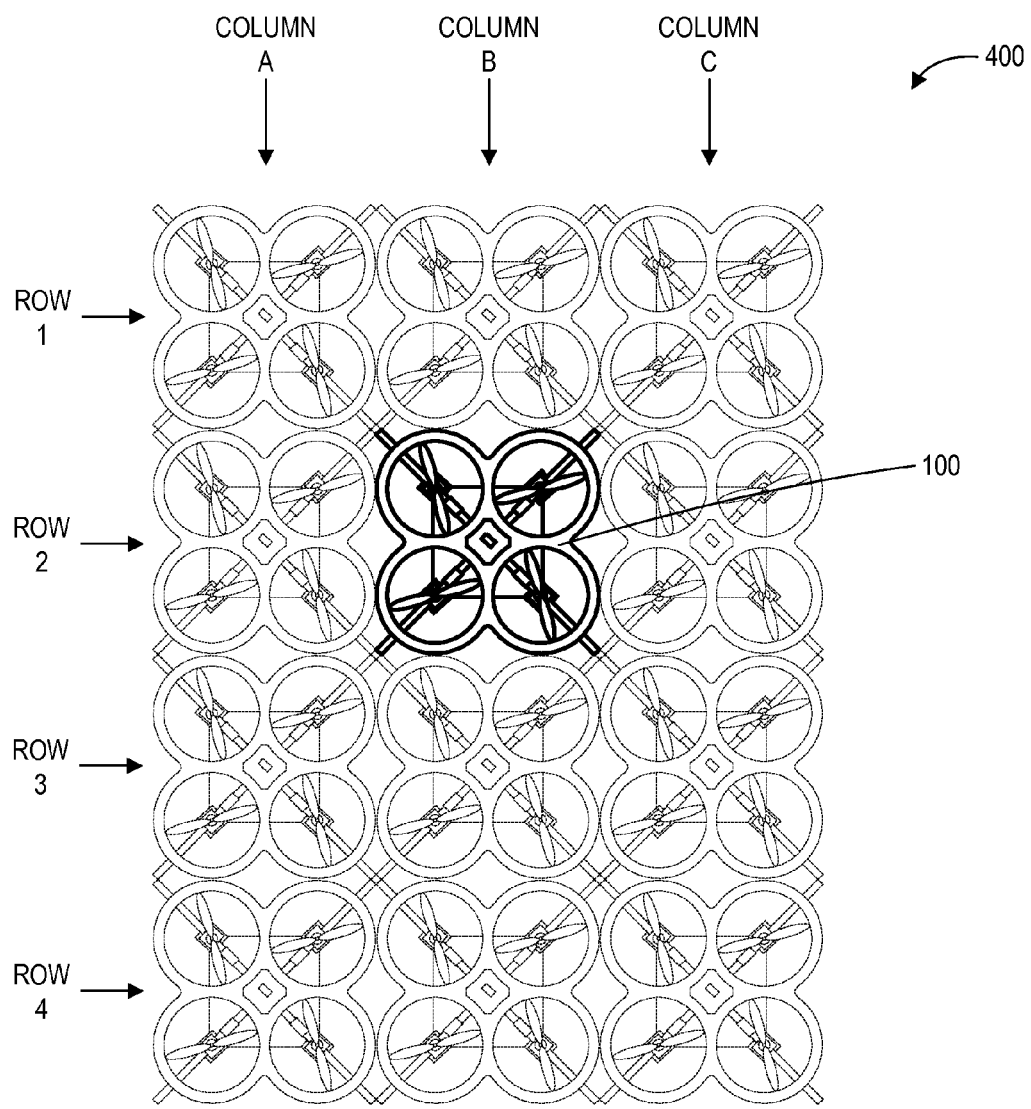
FIG. 4 is a top view of a positioning diagram showing an individual lift vehicle having a four-rotor configuration positioned within an array of available positions for a unified lift vehicle according to various embodiments presented herein.

FIGS. 4-6C will now be described to illustrate various concepts with respect to the arrangement of individual lift vehicles 100 to create unified lift vehicles 200 of varying formations. FIG. 4 shows an individual lift vehicle 100 in solid lines positioned within an array of available positions within a positioning diagram 400 for a unified lift vehicle 200. The positioning diagram 400 is for illustrative purposes only to show the available positions for individual lift vehicles 100 in the creation of a unified lift vehicle 200. The available positions for individual lift vehicles 100 are drawn with broken lines within columns A-C and rows 1-4. This example is shown with respect to a positioning diagram 400 for a unified lift vehicle 200 having an array of three columns and four rows of potential individual lift vehicle 100 positions. It should be appreciated that any number of columns and rows may be utilized according to the particular implementation.

Figure 5:
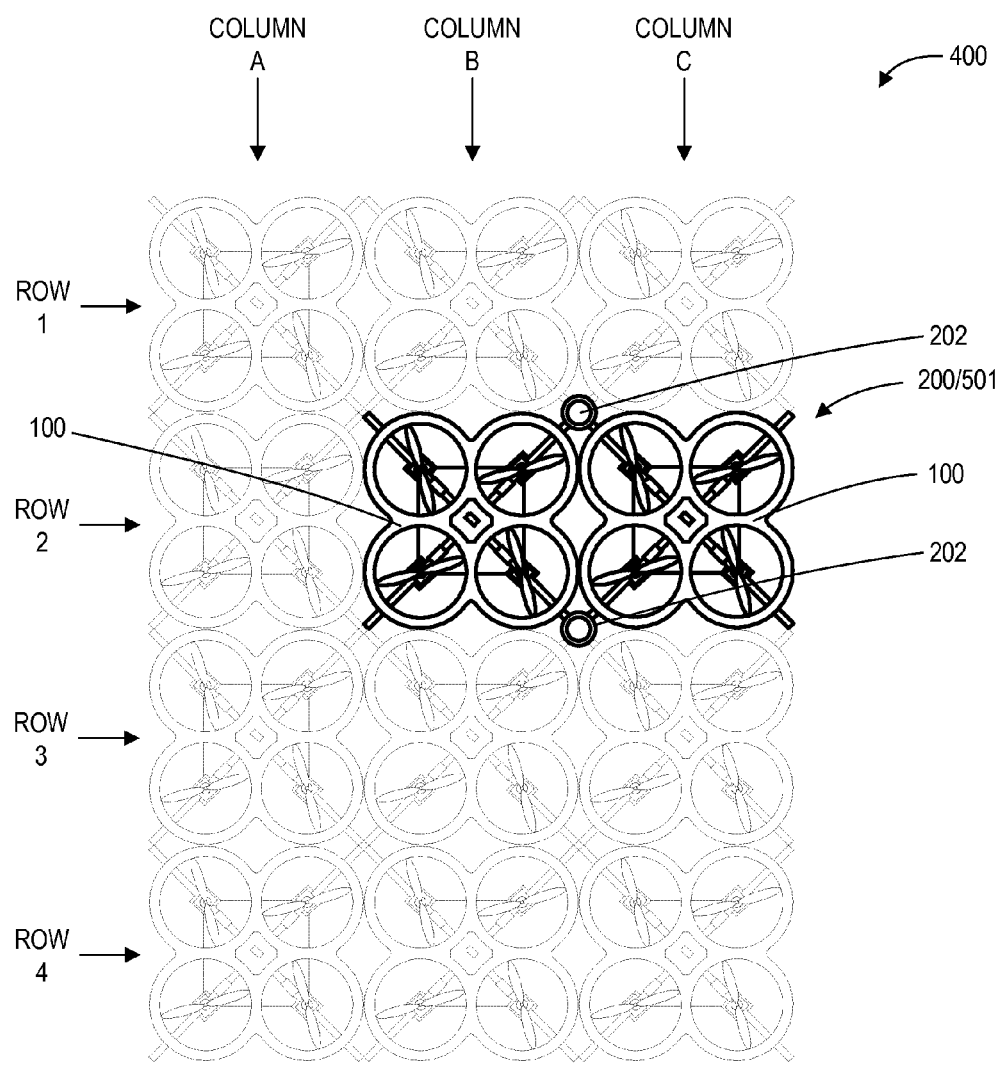
FIG. 5 is a top view of a positioning diagram showing a unified lift vehicle having two individual lift vehicles with four-rotor configurations according to various embodiments presented herein.

Turning to FIG. 5, a unified lift vehicle 200 created from two individual lift vehicles 100 is shown. The individual lift vehicles 100 are rigidly connected via connection mechanisms 202 in positions within column B, row 2 and column C, row 2 to form a 2×1 formation 501. Although the connection mechanisms 202 are shown as being circular, or even omitted for clarity such that the frames 108 of the individual lift vehicles 100 abut or intersect, the connection mechanisms 202 may be any appropriate shape and size as will be described in greater detail below with respect to FIGS. 15-20.

Figure 6A:
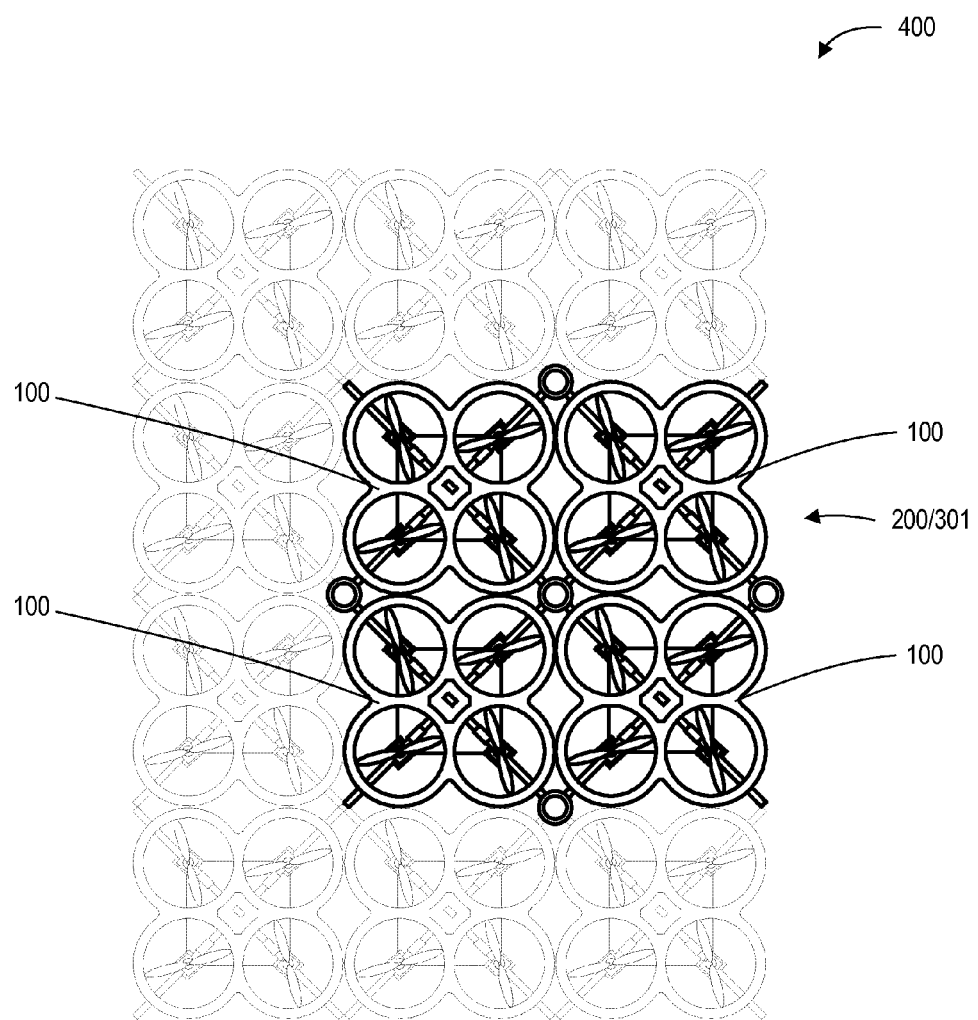
FIGS. 6A-6C are top views a positioning diagram showing a unified lift vehicle having four individual lift vehicles with four-rotor configurations arranged in various lifting array formations according to various embodiments presented herein.
Figure 6B:
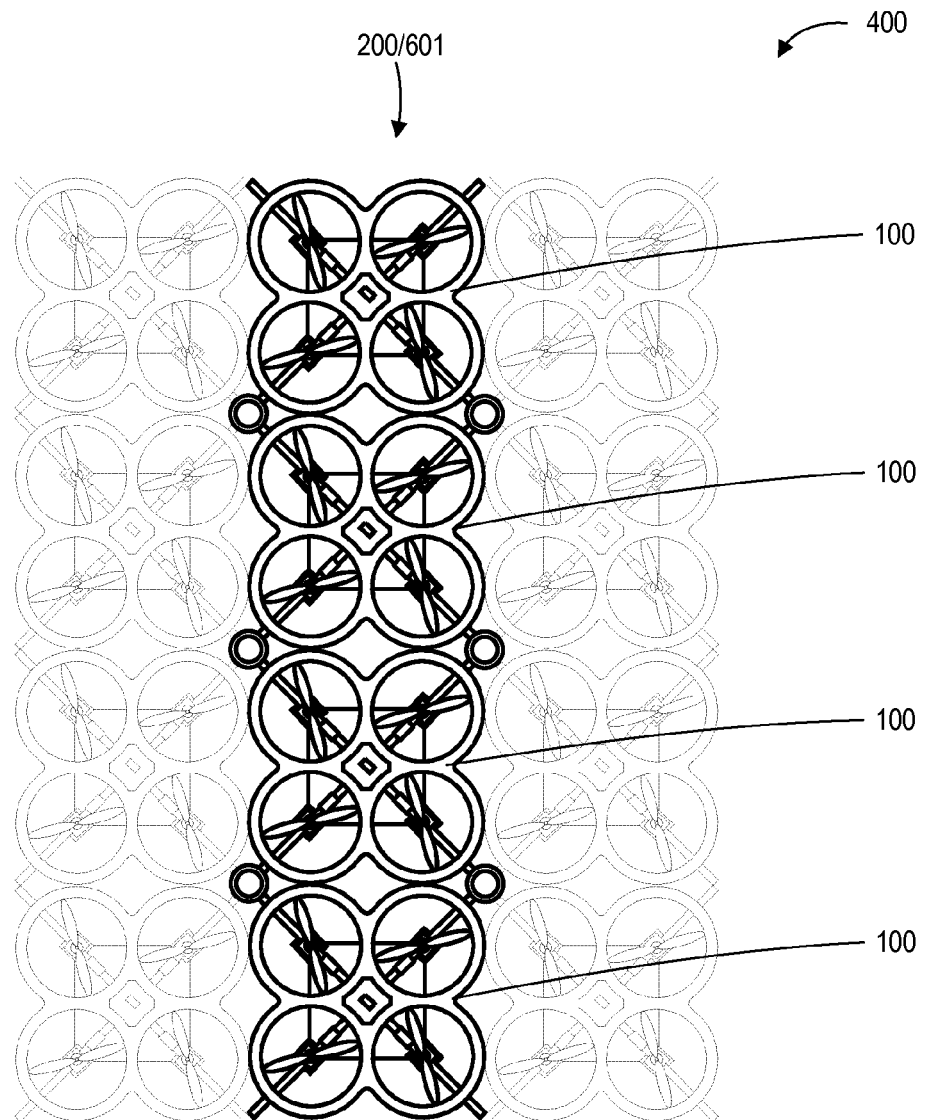
Figure 6C:
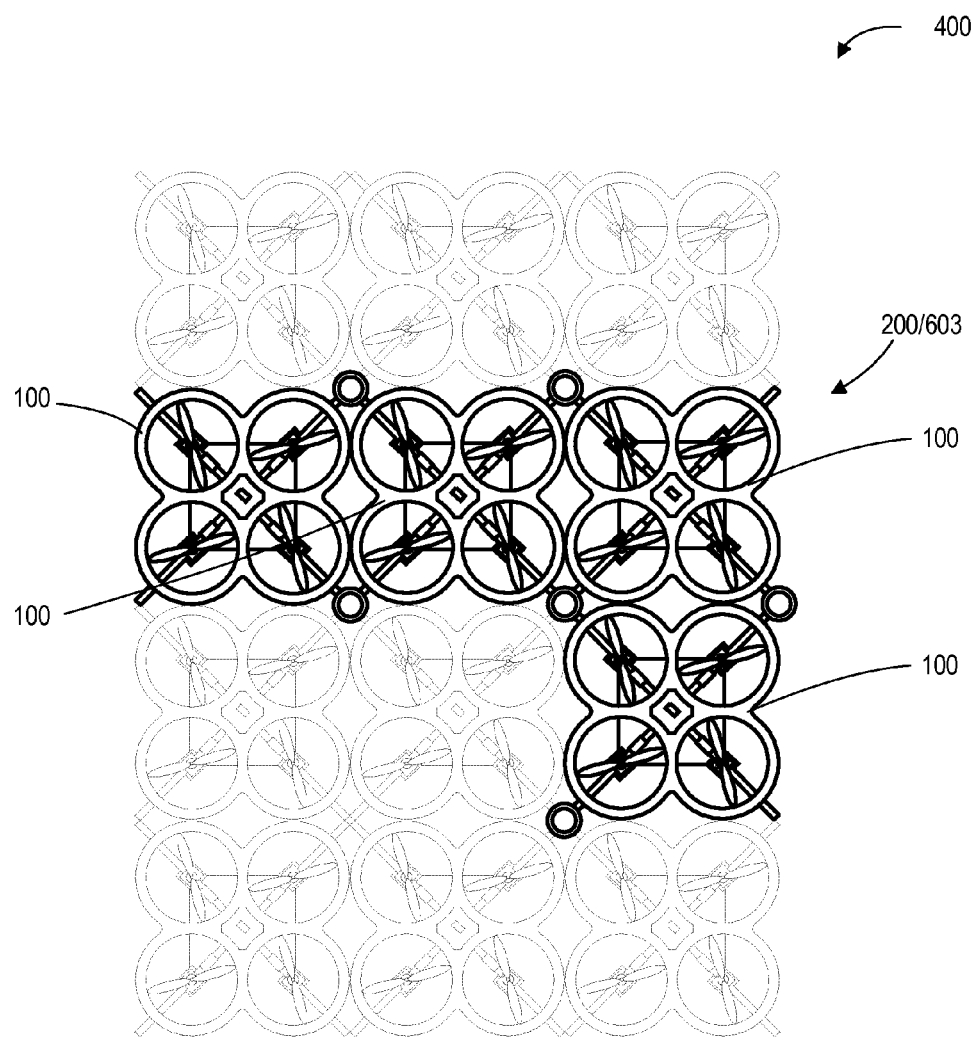

FIGS. 6A-6C show three examples of alternative formations of a unified lift vehicle 200 having four individual lift vehicles 100 rigidly connected together. FIG. 6A shows the positioning diagram 400 having a unified lift vehicle 200 created from arranging the individual lift vehicles 100 according to the 2×2 formation 301 shown and described above. FIG. 6B shows the positioning diagram 400 having a unified lift vehicle 200 creating from arranging the individual lift vehicles 100 according to a 1×4 formation 601 in which the individual lift vehicles 100 are linearly arranged in a single column. FIG. 6C shows the positioning diagram 400 having a unified lift vehicle 200 creating from arranging the individual lift vehicles 100 according to an asymmetric formation 603. The asymmetric formation 603 of this example is generally "L" shaped, although any shape may be appropriate depending on the criteria of the particular lift mission for which the unified lift vehicle 200 will be used, such as the geometry of the payload 120 or the characteristics of the location to which the payload 120 is to be delivered.

These examples discussed with respect to FIGS. 4-6C have been shown in the context of a positioning diagram containing an array of individual lift vehicles 100. Doing so illustrates the potential placement of any appropriate number of individual lift vehicles 100 according to any specific implementation. The precise number and placement of the individual lift vehicles 100, as well as the coupling and communication linkage between the individual lift vehicles 100 and a remote control system will be described in detail below.

Figure 7:
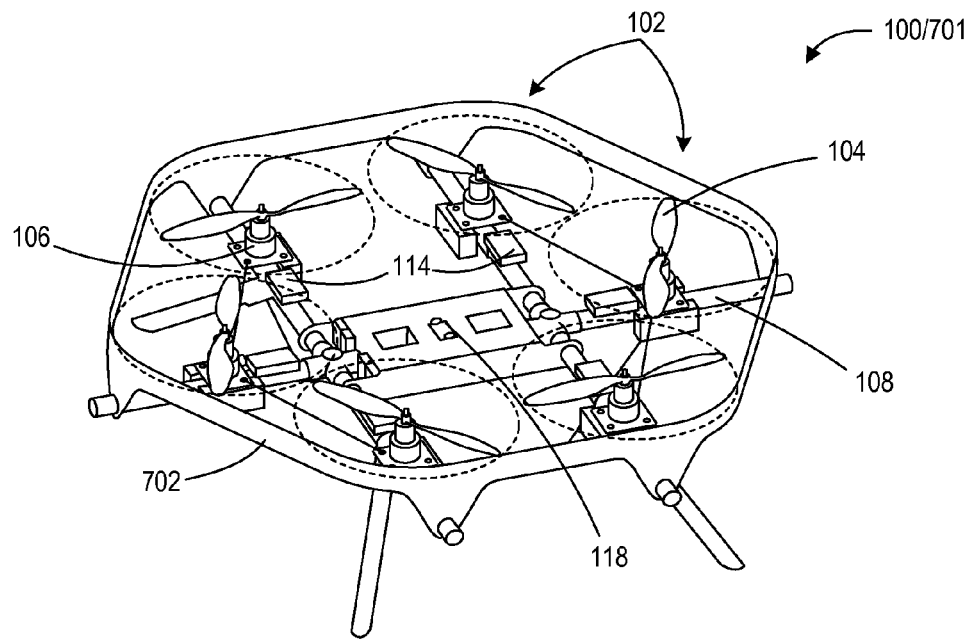
FIG. 7 is a perspective view of an individual lift vehicle utilizing a six-rotor configuration according to various embodiments presented herein.

Prior to discussing the coupling of the individual lift vehicles 100 and the corresponding electrical and data linkages that facilitate control of the unified lift vehicle 200, examples of alternative configurations of an individual lift vehicle 100 will be shown and described. FIG. 7 shows an individual lift vehicle 100 having a six-rotor configuration 701 according to various embodiments. The individual lift vehicle 100 having the six-rotor configuration 701 is similar to the individual lift vehicle 100 having the four-rotor configuration 101 described above, with the primary exception being that the six-rotor configuration 701 utilizes six drive units 102 rather than four. The frame 108 may be configured accordingly to accommodate the six drive units 102 with corresponding rotors 104, motors 106, and speed controllers 114. The individual lift vehicle 100 may additionally include a control and sensor suite 118 and other applicable components. While the drive units 102 are spaced and positioned to create a substantially hexagonal perimeter 702, any suitable arrangement may be used, including arranging the drive units 102 in an array to create a substantially rectangular perimeter (not shown).

Figure 8:
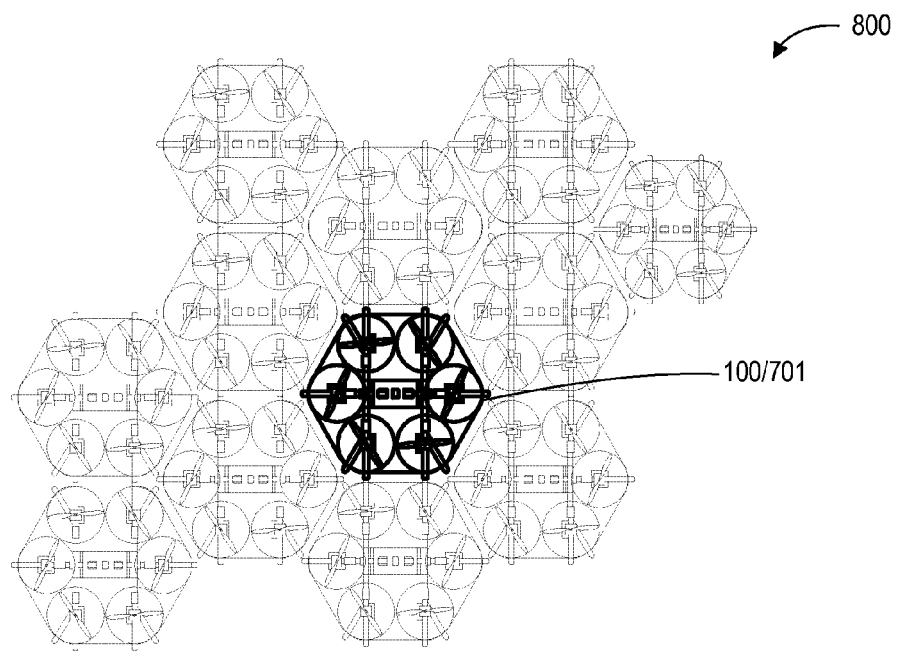
FIG. 8 is a top view of a positioning diagram showing an individual lift vehicle having a six-rotor configuration positioned within an array of available positions for a unified lift vehicle according to various embodiments presented herein.
Figure 9:
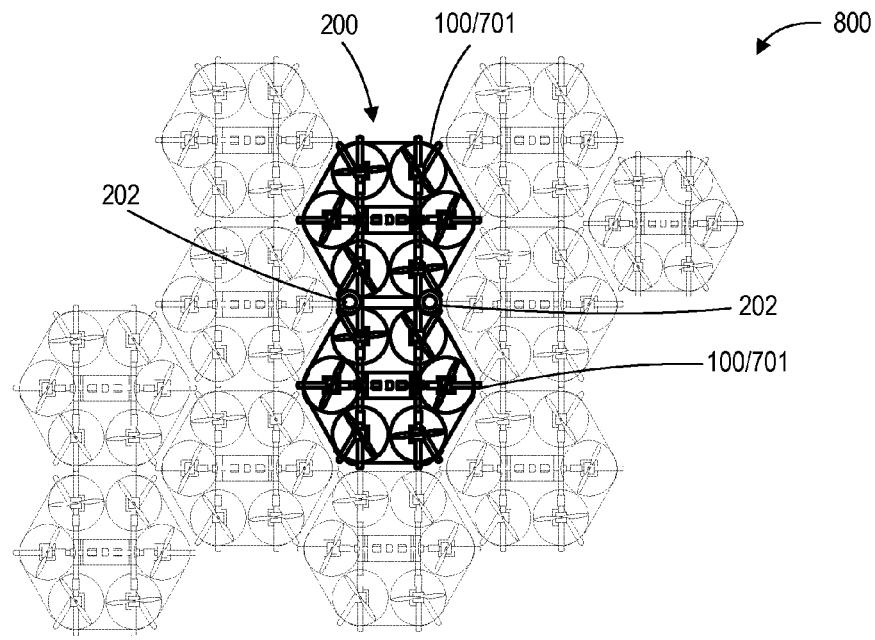
FIG. 9 is a top view of a positioning diagram showing a unified lift vehicle having two individual lift vehicles with six-rotor configurations according to various embodiments presented herein.
Figure 10:
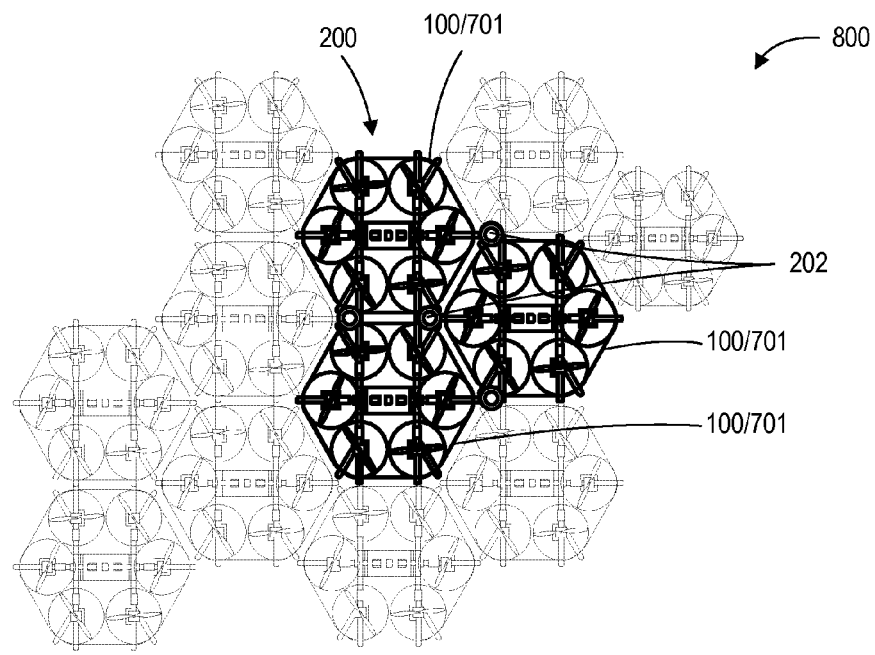
FIG. 10 is a top view of a positioning diagram showing a unified lift vehicle having three individual lift vehicles with six-rotor configurations according to various embodiments presented herein.

FIGS. 8-10 show examples of a positioning diagram 800 with arrangements of one, two, and three individual lift vehicles 100, respectively, each with a six-rotor configuration 701. FIG. 8 shows a single individual lift vehicle 100 with a six-rotor configuration 701 placed within the positioning diagram 800. The positioning diagram 800 illustrates how the edges of hexagonally shaped individual lift vehicles 100 may be placed adjacent to, and potentially abutting, one another when creating a unified lift vehicle 200. FIG. 9 shows the potential placement of two individual lift vehicles 100, each with a six-rotor configuration 701, in creating a unified lift vehicle 200. FIG. 10 similarly shows a unified lift vehicle 200 having three individual lift vehicles 100 with six-rotor configurations 701.

Figure 11:
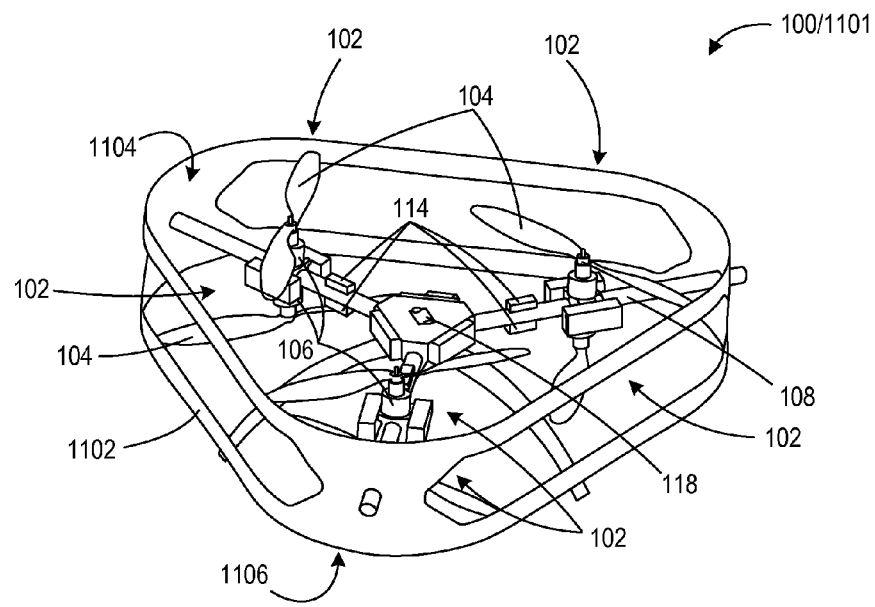
FIG. 11 is a perspective view of an individual lift vehicle utilizing an alternative six-rotor configuration according to various embodiments presented herein.

FIG. 11 shows an individual lift vehicle 100 having an alternative six-rotor configuration 1101 according to various embodiments. In this embodiment, the alternative six-rotor configuration 1101 includes three drive units 102 with corresponding rotors 104, motors 106, and speed controllers 114 mounted on a top side 1104 of the frame 108 and facing upwards. Three additional drive units 102 with corresponding rotors 104, motors 106, and speed controllers 114 are mounted on a bottom side 1106 of the frame 108 facing downwards, opposite the drive units 102 on the top side 1104. The drive units 102 on the bottom side 1106 may be counter-rotating such that they rotate in opposite directions as the drive units 102 on the top side 1104. In this manner, the drive units 102 on the top side 1104 may be described as being operative to pull the individual lift vehicle 100 upwards, while the drive units 102 on the bottom side 1106 may be described as being operative to push the individual lift vehicle 100 upwards.

As with other individual lift vehicles 100 described herein, the speed controllers 114 may be responsive to remote control inputs to vary the rotational speeds of the motors 106 and corresponding rotors 104 in an appropriate manner to maneuver the individual lift vehicle 100 in a desired direction and speed. The individual lift vehicle 100 may additionally include a control and sensor suite 118 and other applicable components. While the drive units 102 are spaced and positioned to create a substantially triangular perimeter 1102, other arrangements may be used without departing from the scope of this disclosure.

Figure 12:
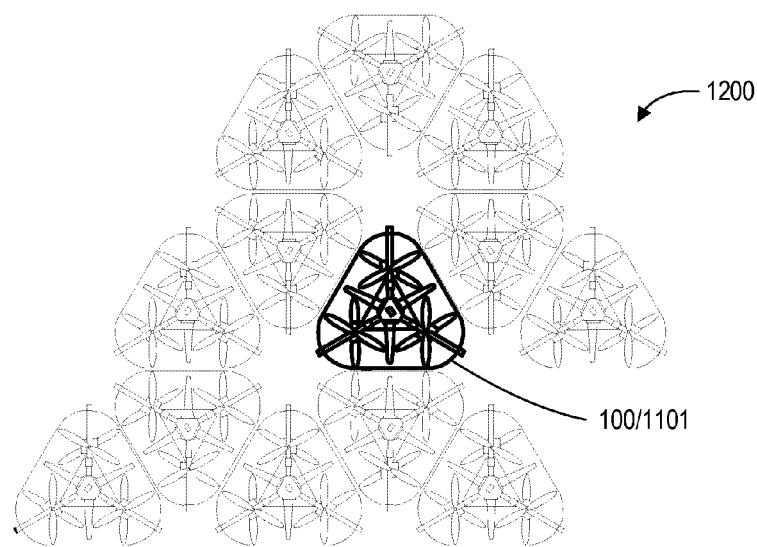
FIG. 12 is a top view of a positioning diagram showing an individual lift vehicle having an alternative six-rotor configuration positioned within an array of available positions for a unified lift vehicle according to various embodiments presented herein.
Figure 13:
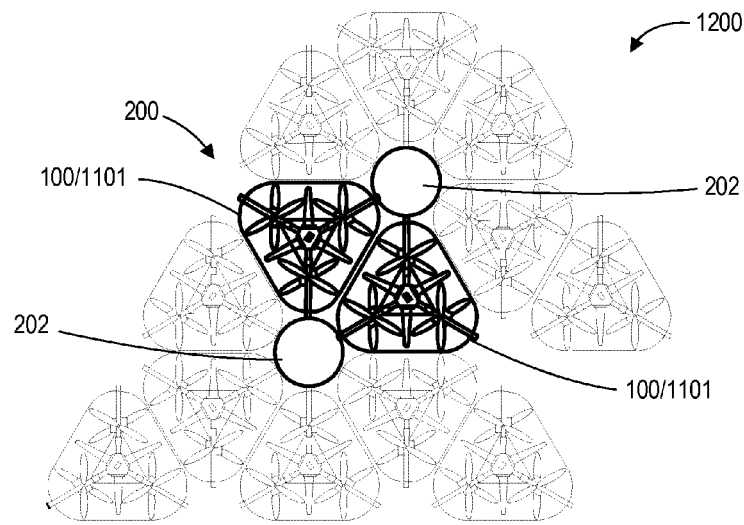
FIG. 13 is a top view of a positioning diagram showing a unified lift vehicle having two individual lift vehicles with alternative six-rotor configurations according to various embodiments presented herein.
Figure 14:
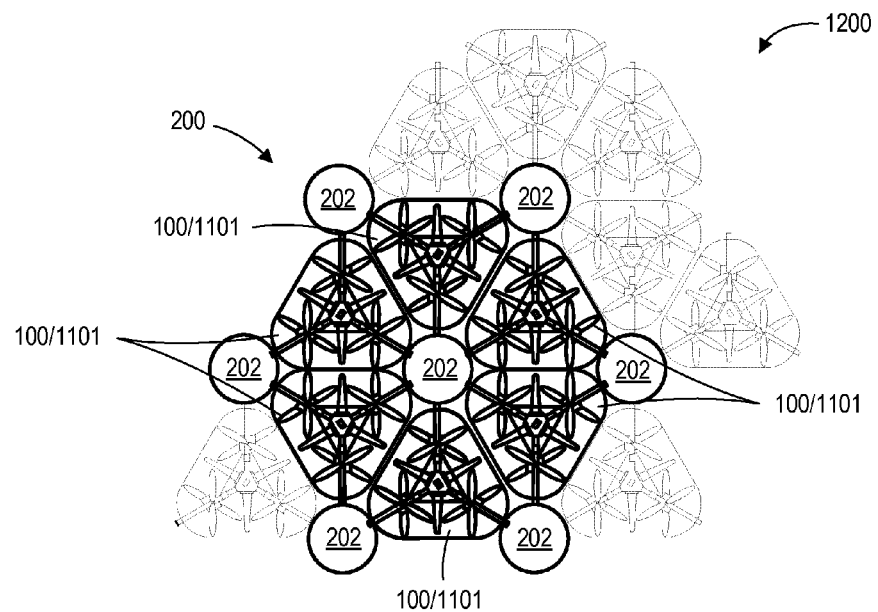
FIG. 14 is a top view of a positioning diagram showing a unified lift vehicle having six individual lift vehicles with alternative six-rotor configurations according to various embodiments presented herein.

FIGS. 12-14 show examples of a positioning diagram 1200 with arrangements of one, two, and six individual lift vehicles 100, respectively, each with an alternative six-rotor configuration 1101. FIG. 12 shows a single individual lift vehicle 100 with an alternative six-rotor configuration 1101 placed within the positioning diagram 1200. The positioning diagram 1200 illustrates how the edges of triangular shaped individual lift vehicles 100 may be placed adjacent to, and potentially abutting, one another when creating a unified lift vehicle 200. FIG. 13 shows the potential placement of two individual lift vehicles 100, each with the alternative six-rotor configuration 1101, in creating a unified lift vehicle 200 via connection mechanisms 202. FIG. 14 similarly shows a unified lift vehicle 200 having six individual lift vehicles 100 with alternative six-rotor configurations 1101.

As previously discussed, individual lift vehicles 100 of a unified lift vehicle 200 are rigidly connected via connection mechanisms 202. Various embodiments of the connection mechanisms 202 will now be described. The connection mechanisms 202 of FIGS. 15-20 will be discussed in the context of coupling individual lift vehicles 100 having the four-rotor configuration 101 of FIGS. 1-6C. It should be appreciated that the same connection mechanisms 202, or similar connection mechanisms modified according to the particular implementation, may be utilized to connect any individual lift vehicles 100 having any configuration to create a unified lift vehicle 200.

Figure 15:
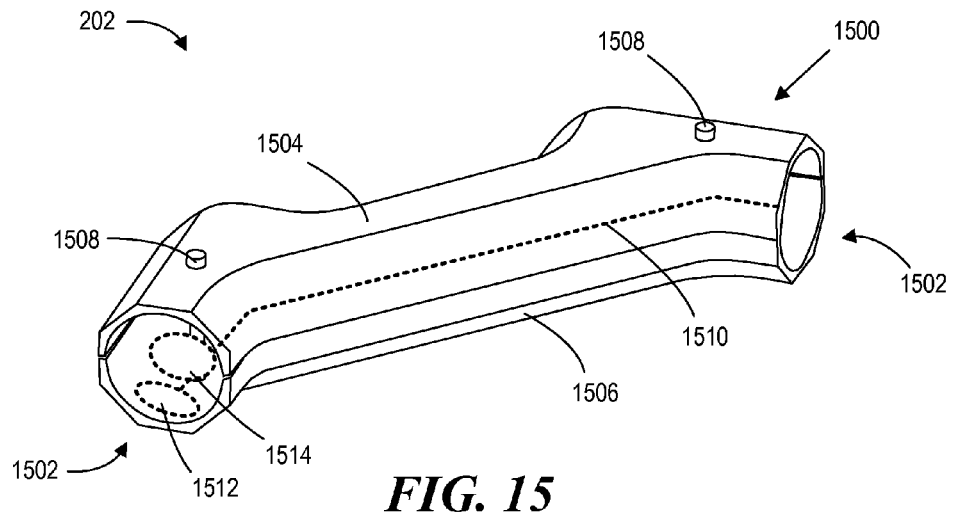
FIGS. 15 and 16 are perspective and exploded views, respectively, of an edge connector according to various embodiments presented herein.
Figure 16:
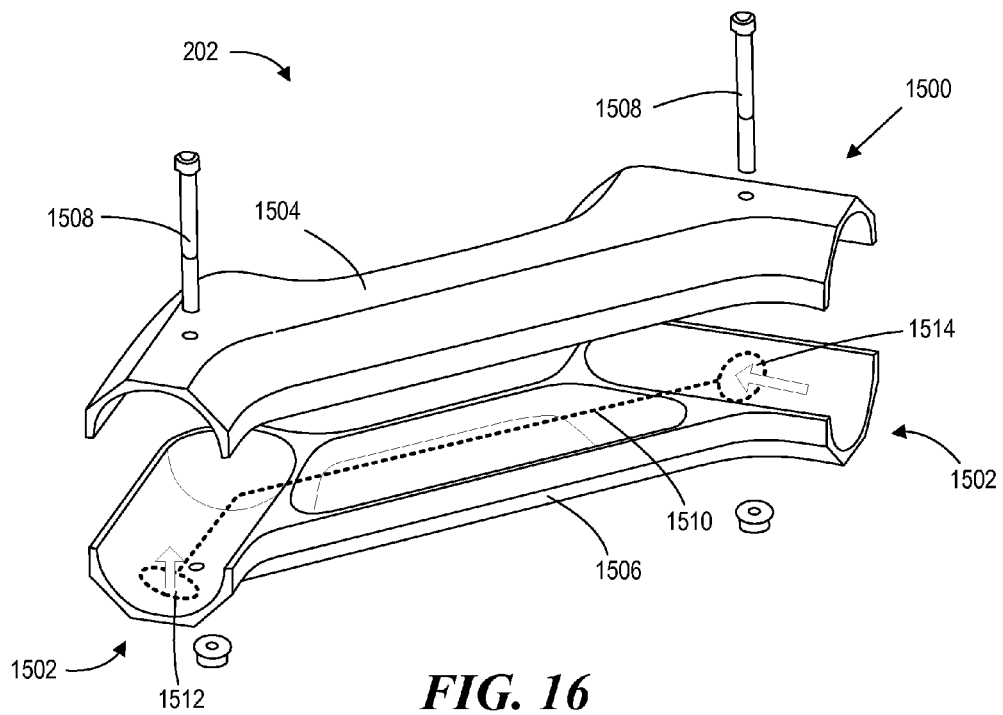
Figure 17:
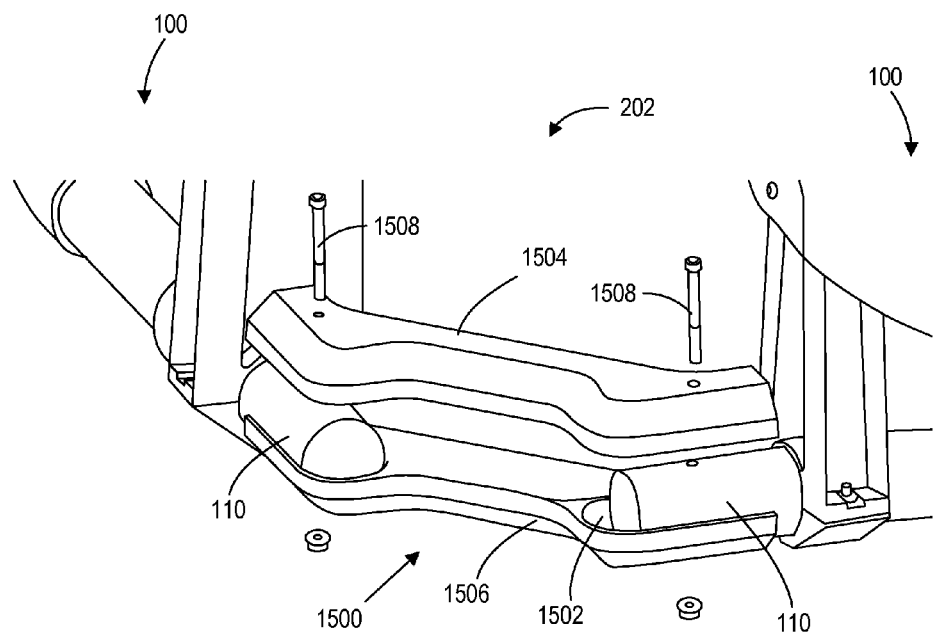
FIG. 17 is a perspective view of the coupling of two individual lift vehicles using an edge connector according to various embodiments presented herein.

Looking at FIGS. 15 and 16, perspective and exploded views, respectively, of a connection mechanism 202 are shown. FIG. 17 depicts a perspective view of individual lift vehicles 100 being coupled with the connection mechanism 202. According to this example, the connection mechanism 202 is an edge connector 1500, which is used for rigidly and communicatively connecting two adjacent connector junctions 110 of adjacent individual lift vehicles 100, as shown in FIG. 17. Examples can additionally be seen in FIGS. 2A, 2C, and at the exterior edges of the unified lift vehicle 200 shown in FIG. 3A, among others. The edge connector 1500 may include a top half 1504, a bottom half 1506, associated fasteners 1508, and connection apertures 1502 at each end of the edge connector 1500. The connection apertures may be defined by the top half 1504 and bottom half 1506 when joined together as seen in FIG. 15, and may be sized and shaped to receive the connector junctions 110 of the individual lift vehicles 100.

According to one embodiment, the connection mechanisms 202 may each include signal transfer lines 1510 extending between opposing connection apertures 1502. The signal transfer lines 1510 may be of the type to transfer electrical and/or data signals between adjacent individual lift vehicles 100. Each connection aperture 1502 may have one or more connectors for communicatively coupling the signal transfer lines 1510 of the connection mechanism 202 to the distribution lines 122 of the adjacent individual lift vehicles 100. FIGS. 15 and 16 each illustrate two alternative embodiments for these connectors.

First, a wall-positioned connector 1512 may be located in the top half 1504 and/or the bottom half 1506 of the connection mechanism 202 and configured to mate with a corresponding connector at an outer surface of the connector junction 110 of the individual lift vehicles 100. In doing so, the wall-positioned connector 1512 may be mated with the corresponding connector of an individual lift vehicle 100 when the top half 1504 and the bottom half 1506 of the connection mechanism 202 are placed around the connector junctions 110 of the adjacent individual lift vehicles 100 such that the connector junctions 110 are sandwiched between the top half 1504 and the bottom half 1506 within the connection apertures 1502. This action is indicated by the open arrow rising upward from the wall-positioned connector 1512 in FIG. 16.

Alternatively, an end connector 1514 may be located at or near the inner end of each of the connection apertures 1502 and configured to mate with a corresponding connector at an end of each of the connector junction 110 of the individual lift vehicles 100 being coupled together. In doing so, the end connector 1514 may be mated with the corresponding connector of an individual lift vehicle 100 when the connector junction 110 is slid into a connection aperture 1502. This action is indicated by the open arrow extending inward toward the end connector 1514 in FIG. 16.

It should be noted that FIGS. 15 and 16 show both a wall-positioned connector 1512 and an end connector 1514 used within a single connection mechanism 202 for illustrative purposes. However, each connection mechanism 202 may include a single type of connector depending on the particular application. Moreover, the wall-positioned connector 1512 and the end connector 1514 are depicted as ovals using broken lines to convey that any suitable type of connectors may be used depending on the application. Other connector types may include a male/female type push pin connection where the connection junction 110 may include a female electrical connector and the connection mechanism 202 may include a corresponding male electrical connector for communicatively connecting the distribution lines 122 of adjacent individual lift vehicles 100. This disclosure is not limited to any particular type of connector, or any specific placement of the connector on or within the connection mechanism 202.

FIG. 17 shows a perspective view of individual lift vehicles 100 being coupled with the edge connector 1500. According to this embodiment, the connector junctions 110 are positioned within the connection apertures 1502 of the bottom half 1506 of the edge connector 1500 and sandwiched in place by the top half 1504. The appropriate signal connections are made via the wall-positioned connector 1512 or the end connector 1514 (connectors not shown in FIG. 17) prior to securing the top half 1504 and bottom half 1506 together using the fasteners 1508. According to various embodiments, the fasteners 1508 may be of an appropriate material and size to shear during a crash in order to mitigate damage to the individual lift vehicles 100. In other examples, connection between the connection junction 110 and the connection mechanism 202 may be facilitated by a compression fit, band or saddle type clamp, or similar type connection structure and method.

Figure 18:
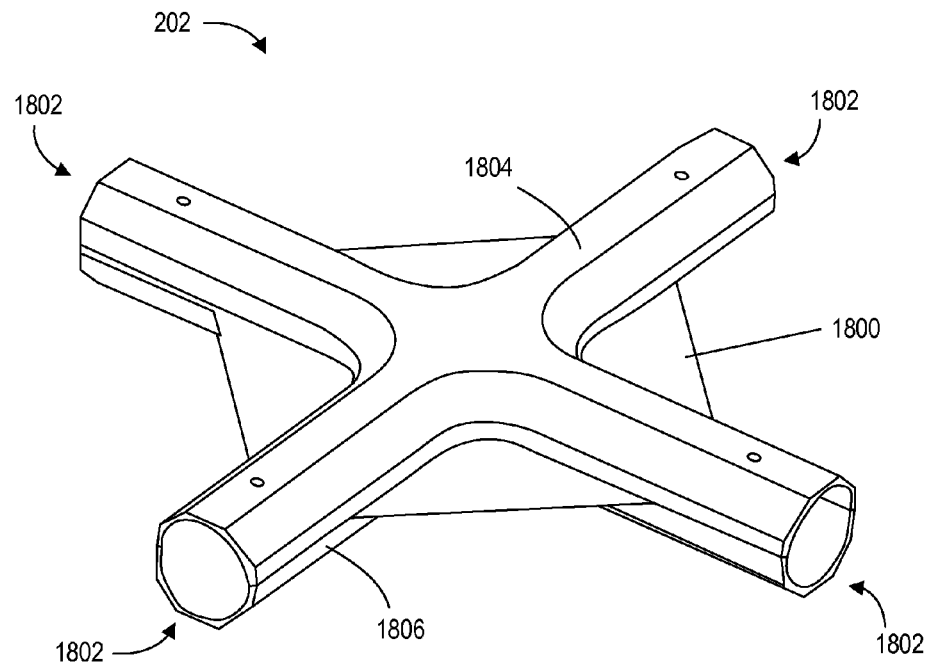
FIGS. 18 and 19 are perspective and exploded views, respectively, of a central connector according to various embodiments presented herein.
Figure 19:
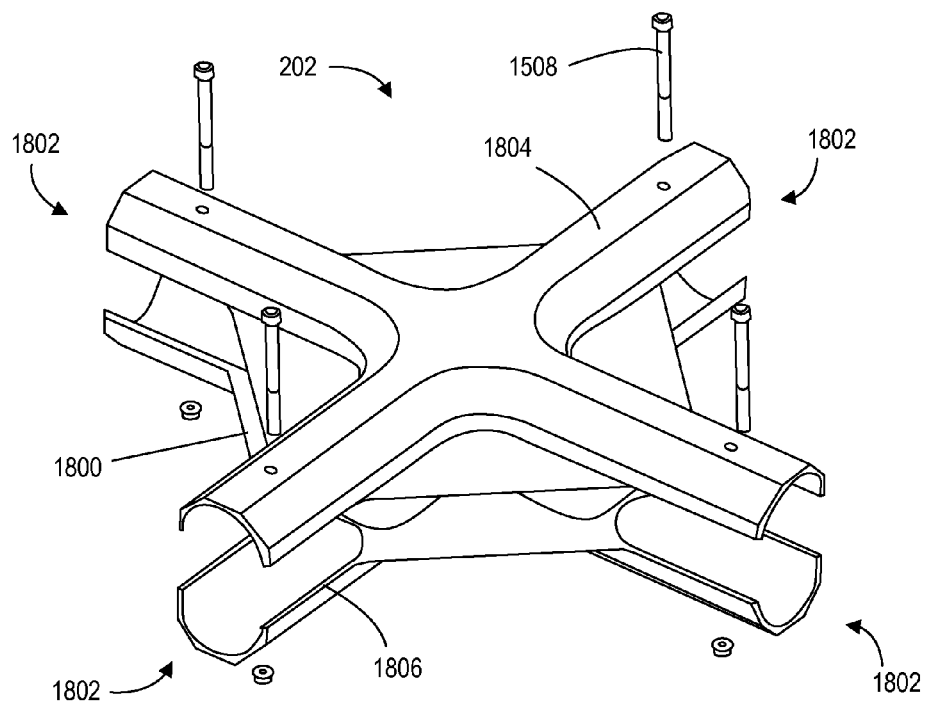
Figure 20:
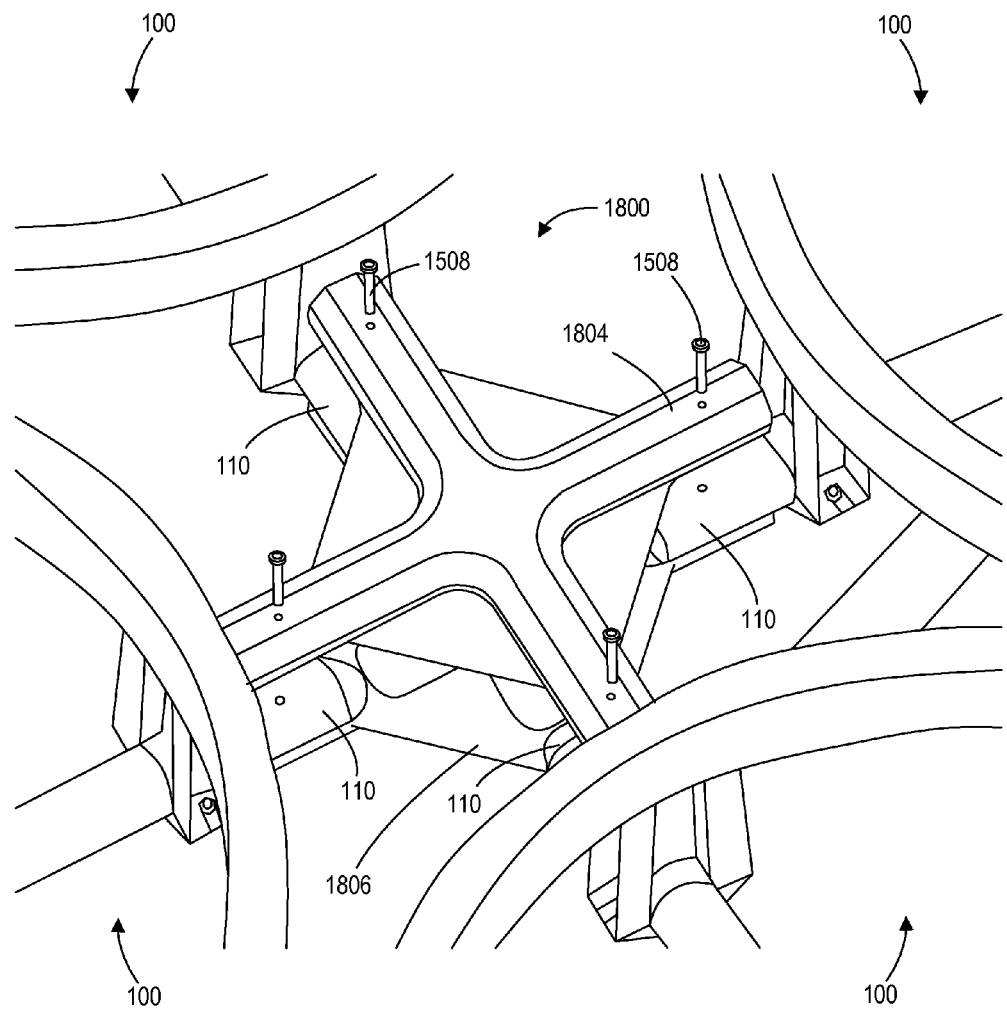
FIG. 20 is a perspective view of the coupling of four individual lift vehicles using a central connector according to various embodiments presented herein.

Looking at FIGS. 18 and 19, perspective and exploded views, respectively, of a connection mechanism 202 is shown. FIG. 20 depicts a perspective view of individual lift vehicles 100 being coupled using the connection mechanism 202. According to this example, the connection mechanism 202 is a central connector 1800, which is used for rigidly and communicatively connecting three or more adjacent connector junctions 110 of adjacent individual lift vehicles 100, as shown in FIG. 20. In this example, the central connector 1800 is configured to rigidly couple four connector junctions 110 of four corresponding individual lift vehicles 100. An example of this use may be seen in the center of the unified lift vehicle 200 shown in FIG. 3A.

The central connector 1800 may include a top half 1804, a bottom half 1806, associated fasteners 1508, and connection apertures 1802 at each end of the central connector 1800. The connection apertures 1802 may be defined by the top half 1804 and bottom half 1806 when joined together as seen in FIG. 18, and may be sized and shaped to receive the connector junctions 110 of the individual lift vehicles 100. Although not shown in FIGS. 18-20 for clarity purposes, the central connector 1800 may include signal transfer lines 1510 and associated connectors, such as the wall-positioned connector 1512 or the end connector 1514, described above with respect to the edge connector 1500.

FIG. 20 shows a perspective view of individual lift vehicles 100 being coupled with the central connector 1800. According to this embodiment, the connector junctions 110 are positioned within the connection apertures 1802 of the bottom half 1806 of the central connector 1800 and sandwiched in place by the top half 1804. The appropriate signal connections are made via the wall-positioned connector 1512 or the end connector 1514 (connectors not shown in FIG. 20) prior to securing the top half 1804 and bottom half 1806 together using the fasteners 1508. As discussed above, the fasteners 1508 may be of an appropriate material and size to shear during a crash in order to mitigate damage to the individual lift vehicles 100.

Figures 21A, 21B:
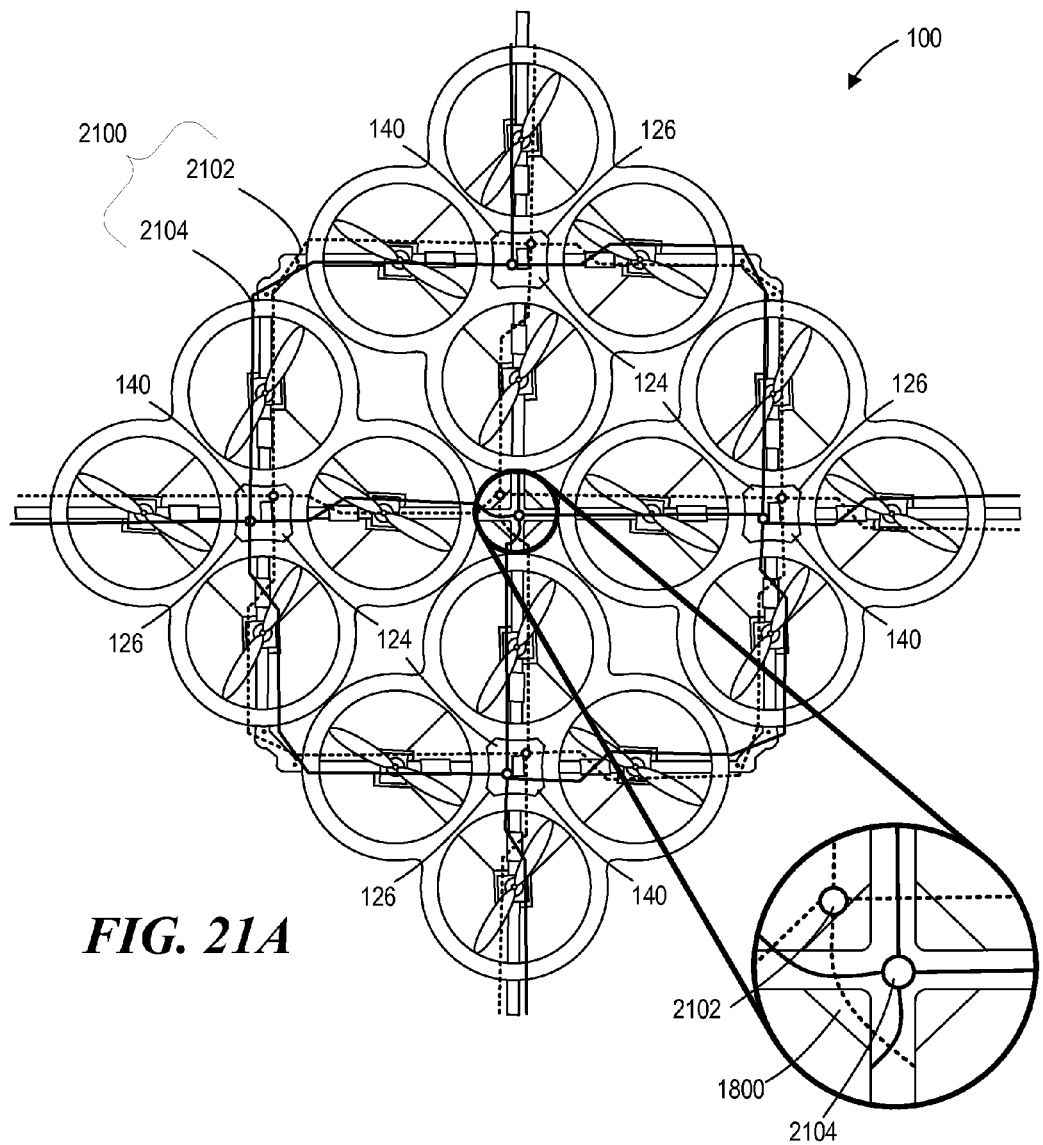
FIG. 21A is a top view of a unified lift vehicle illustrating electrical and data circuits throughout the individual lift vehicles and corresponding connection mechanisms according to various embodiments presented herein.
FIG. 21B is an expanded view of a central connector of the unified lift vehicle of FIG. 21A, showing representations of positive and negative wiring polarities associated with the central connector, according to various embodiments presented herein.

FIGS. 21A and 21B illustrate the circuits 2100 created by the communicative coupling of the distribution lines 122 of the individual lift vehicles 100 of a unified lift vehicle 200 via the signal transfer lines 1510 of the connection mechanisms 202 according to one embodiment. FIG. 21A shows the circuits 2100 that provide for electrical and/or data transmission between the individual lift vehicles 100. In the context of power distribution, the wiring in the individual lift vehicles 100 and corresponding unified lift vehicle 200 may have a designated polarity such as positive 2102 (represented with broken lines) and negative 2104 (represented with solid lines).

According to various embodiments, each individual lift vehicle 100 includes its own power source 124, such as a battery stored within the hub 126 or other location as described above. In this manner, each power source 124 may be dedicated to the associated individual lift vehicle 100 in which it is located. Alternatively, power may be shared amongst the individual lift vehicles 100 of a unified lift vehicle 200 via the circuits 2100. According to one embodiment, a ground power supply line may be used to connect and charge all of the batteries within the unified lift vehicle 200 via a ground power receptacle (not shown) that is electrically connected to the circuits 2100.

The circuits 2100 may additionally or alternatively be configured to communicatively connect the individual lift vehicles 100 so that data may be transferred between the individual lift vehicles 100. According to one embodiment, control data may include any computer-implemented instructions or other input that when implemented, may cause one or more speed controllers 114 to alter a speed of a motor 106 and corresponding rotor 104 to affect a flight characteristic of an individual lift vehicle 100 or unified lift vehicle 200.

According to one embodiment, the control data may be sent wirelessly from a remote control device to each controller 140 associated with each individual lift vehicle 100. Each controller 140 may then control the appropriate drive unit 102 according to the control data over the circuits 2100 to arrive at the desired result. For example, the remote control device may direct a command to a controller 140, the command corresponding to an instruction to increase the speed of one or more drive units 102. The controller 140 may then send an appropriate signal to the speed controller 114 to produce the desired result.

Alternatively, according to another embodiment, the control data may be sent to a controller 140. The controller 140 then makes the appropriate control command determinations according to the received control data. For example, the controller 140 may interpret the received control data and determine that an operational parameter of a particular individual lift vehicle 100, or of a particular drive unit 102 of a particular individual lift vehicle 100, may need to be altered. The controller 140 may then transmit an appropriate command or signal to the applicable individual lift vehicle 100 or drive unit 102 via the circuits 2100 to achieve the desired change. In this manner, a controller 140 of one of the individual lift vehicles 100 of the unified lift vehicle 200 may be used to interpret the flight control input and to provide the appropriate commands to the appropriate individual lift vehicles 100 for producing the desired response. In this embodiment, other controllers 140 may provide redundancy in the event of an operational inconsistency.

Moreover, according to one embodiment, the unified lift vehicle 200 may include one or more data ports (not shown) communicatively coupled to the circuits 2100, allowing for a wired connection to a source for control data. This implementation may be useful for programming flight parameters of a lift mission into the unified lift vehicle 200 for autonomous flight for all or some of the mission.

FIG. 21B shows an expanded view of the central connector 1800 with representations of the positive 2102 (represented with broken lines) and negative 2104 (represented with solid lines) wiring polarities associated with the central connector 1800 as it communicatively connects to the circuits 2100. Embodiments of the connection mechanisms 202 provide for modular, interchangeable components for ease of use and a reduced part count. In other words, the top halves 1504 and the bottom halves 1506 of the edge connectors 1500 are interchangeable. Similarly, the top halves 1804 and the bottom halves 1806 of the central connectors 1800 are interchangeable. Each connection mechanism 202 half includes an identical jumper circuit, such as the signal transfer lines 1510, to transfer power and data between individual lift vehicles 100 regardless of the positioning of the component as a top half or a bottom half of the connection mechanism 202. The wiring within the individual lift vehicles 100 is configured to force the positive 2102 pole to be carried by the top half of the connection mechanisms 202, while the negative 2104 pole is carried by the bottom half of the connection mechanisms 202.

Figure 22:
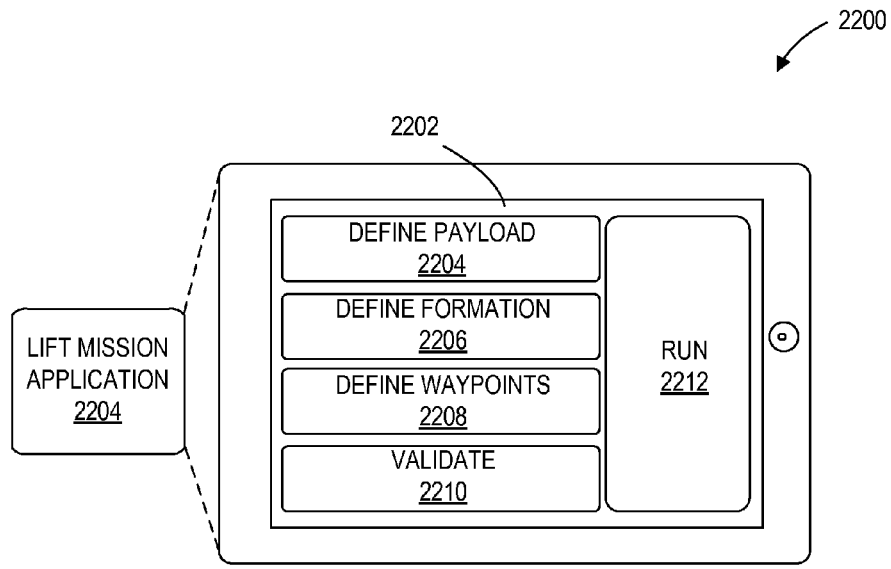
FIG. 22 is a screen diagram of a user interface for a modular vehicle lift system according to various embodiments presented herein.

Turning now to FIGS. 22-33, a remote control device, associated user interface, and a configuration process for performing a lift mission with a unified lift vehicle 200 will be described according to various embodiments. FIG. 22 shows a user interface 2202 of a remote control device 2200. It should be appreciated that the user interface 2202 shown and described herein is an example used for illustrative purposes and should not be construed as limiting. Rather, the user interface 2202 may be configured as desired according to the desired configuration processes and the desired format of the control inputs for controlling the unified lift vehicle 200.

According to one embodiment, the remote control device 2200 may include a tablet computer device, a smartphone, or any handheld remote control input device. A lift mission application 2204 stored on the remote control device 2200 is operative to execute computer-controlled instructions for performing the configuration process operations described below. It should be understood that the remote control device 2200 may include a processor, volatile and/or non-volatile memory, an operating system, and all hardware and software used for wireless communication with the individual lift vehicles 100 and unified lift vehicle 200.

As discussed above, each individual lift vehicle 100 is capable of controlled three-axis flight in response to inputs from the remote control device 2200. Utilizing concepts described herein, a unified lift vehicle 200 created from any number of individual lift vehicles 100 is also operative to perform controlled three-axis flight in response to inputs from the remote control device 2200. In order to direct appropriate control commands to the appropriate individual lift vehicles 100 or drive units 102, the remote control device 2200 provides the user interface 2202 for receiving all applicable data regarding the unified lift vehicle 200 and the corresponding lift mission during a configuration process. Accordingly, the user interface 2202 includes a number of user input controls for initiating various processes.

Figure 23:
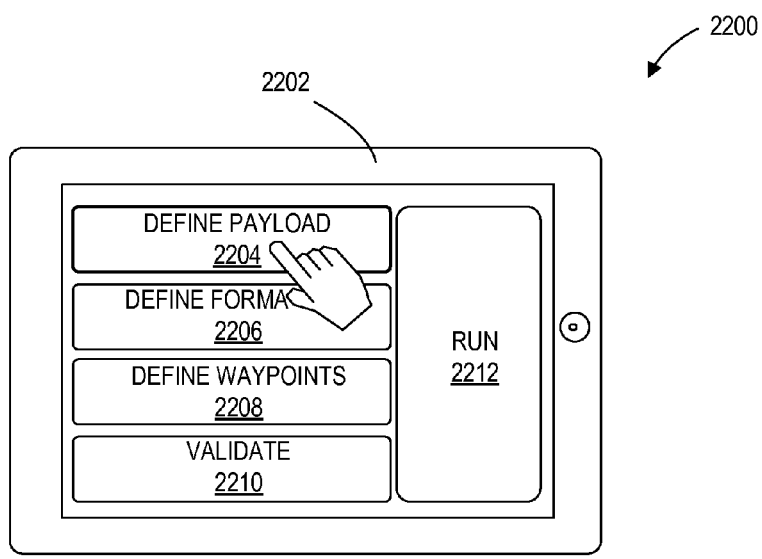
FIG. 23 is a screen diagram of a user interface for a modular vehicle lift system showing the initiation of an example procedure for configuring a lift mission according to various embodiments presented herein.
Figure 24:
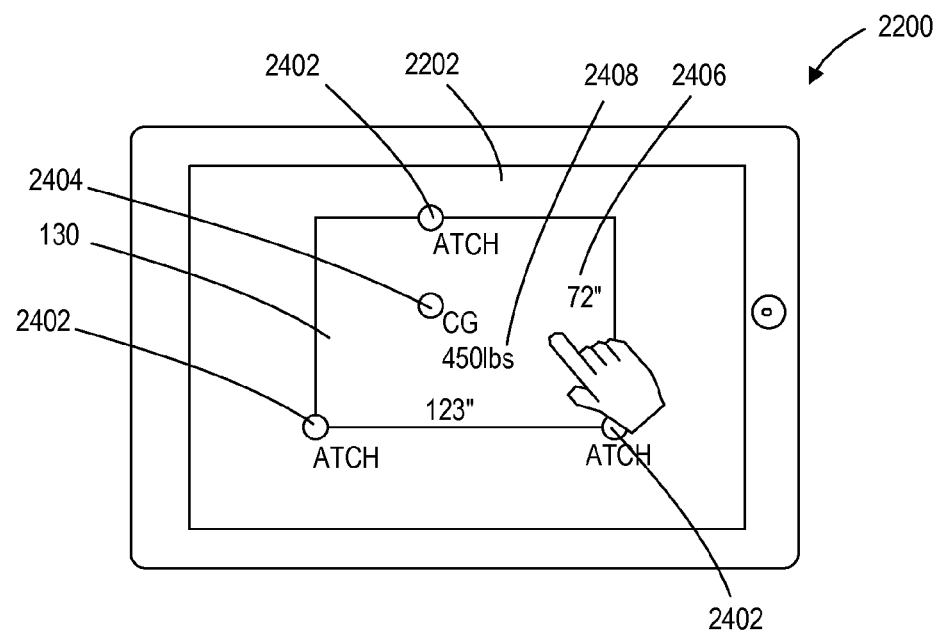
FIG. 24 is a screen diagram of a user interface for a modular vehicle lift system showing a payload definition example according to various embodiments presented herein.
Figure 25:
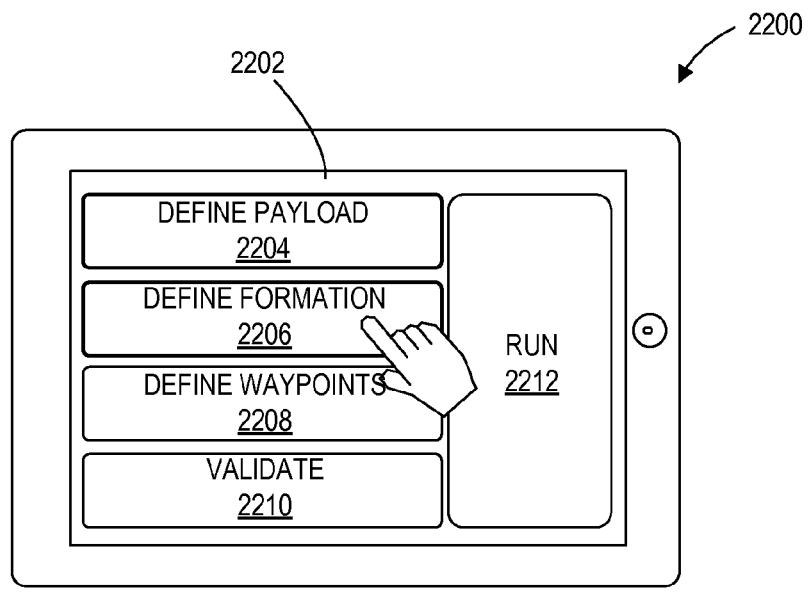
FIG. 25 is a screen diagram of a user interface for a modular vehicle lift system showing the initiation of an example procedure for defining a lifting array formation according to various embodiments presented herein.

According to the example shown in FIG. 22, the user input controls include a define payload control 2204, a define formation control 2206, a define waypoints control 2208, a validate control 2210, and a run control 2212. Fewer or additional user input controls may be utilized without departing from the scope of this disclosure. As seen in FIG. 23, a user may select the define payload control 2204 to initiate the configuration process for a lift mission. According to one embodiment, upon selecting the define payload control 2204, the user interface 2202 displays a general schematic of a rectangular payload 130, shown in FIG. 24. According to various embodiments, other payload shapes may be selected from a menu, or a custom shape created. The user is able to identify attachment positions 2402 in which the unified lift vehicle 200 will be attached to the payload 130 using cables or chains. Alternatively, the attachment positions 2402 may be identified by the lift mission application 2204 after the user has input all other applicable data associated with the payload and unified lift vehicle 200. The user may also identify the center of gravity 2404, as well as provide the dimensions 2406 and weight 2408 of the payload.

Figure 26:
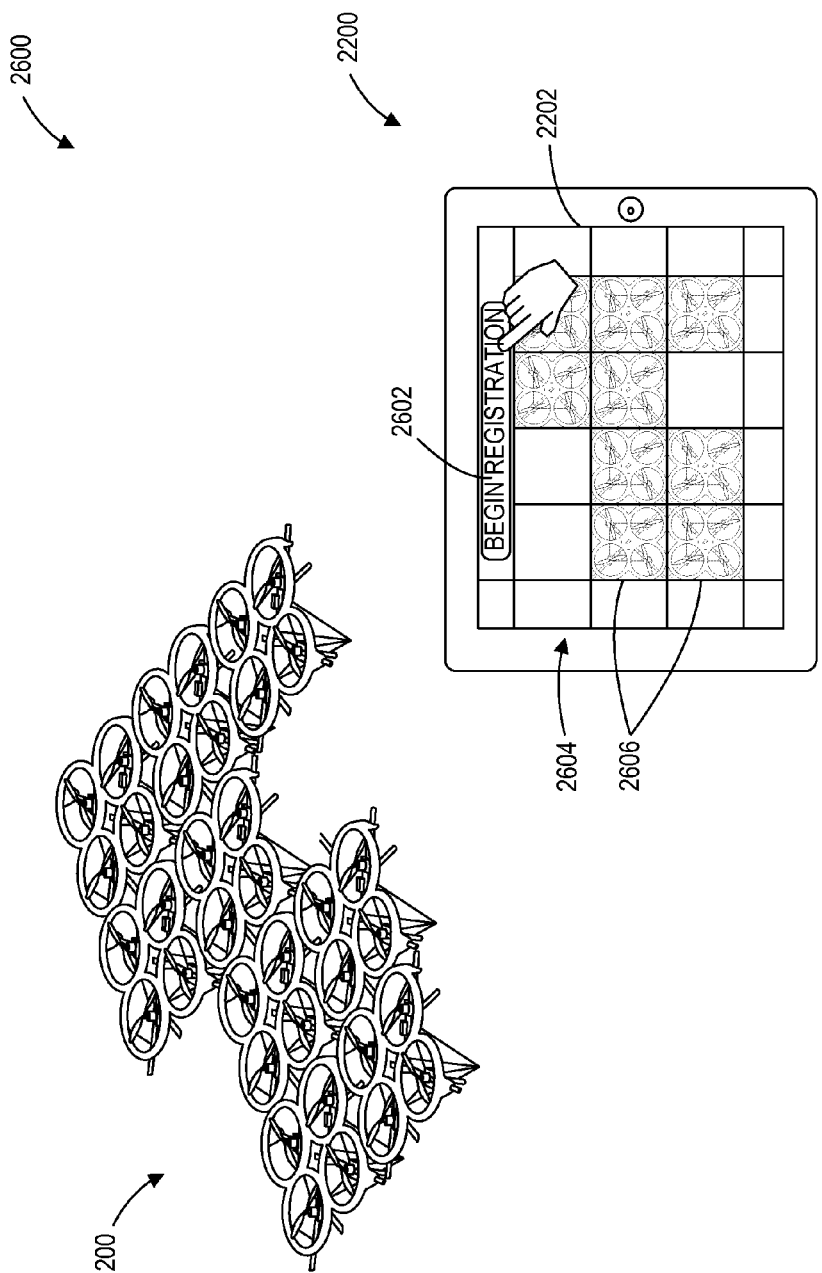
FIGS. 26-29 are screen diagrams of a user interface and a unified lift vehicle of a modular vehicle lift system showing portions of an example procedure for registering individual lift vehicles of the unified lift vehicle according to various embodiments presented herein.
Figure 27:
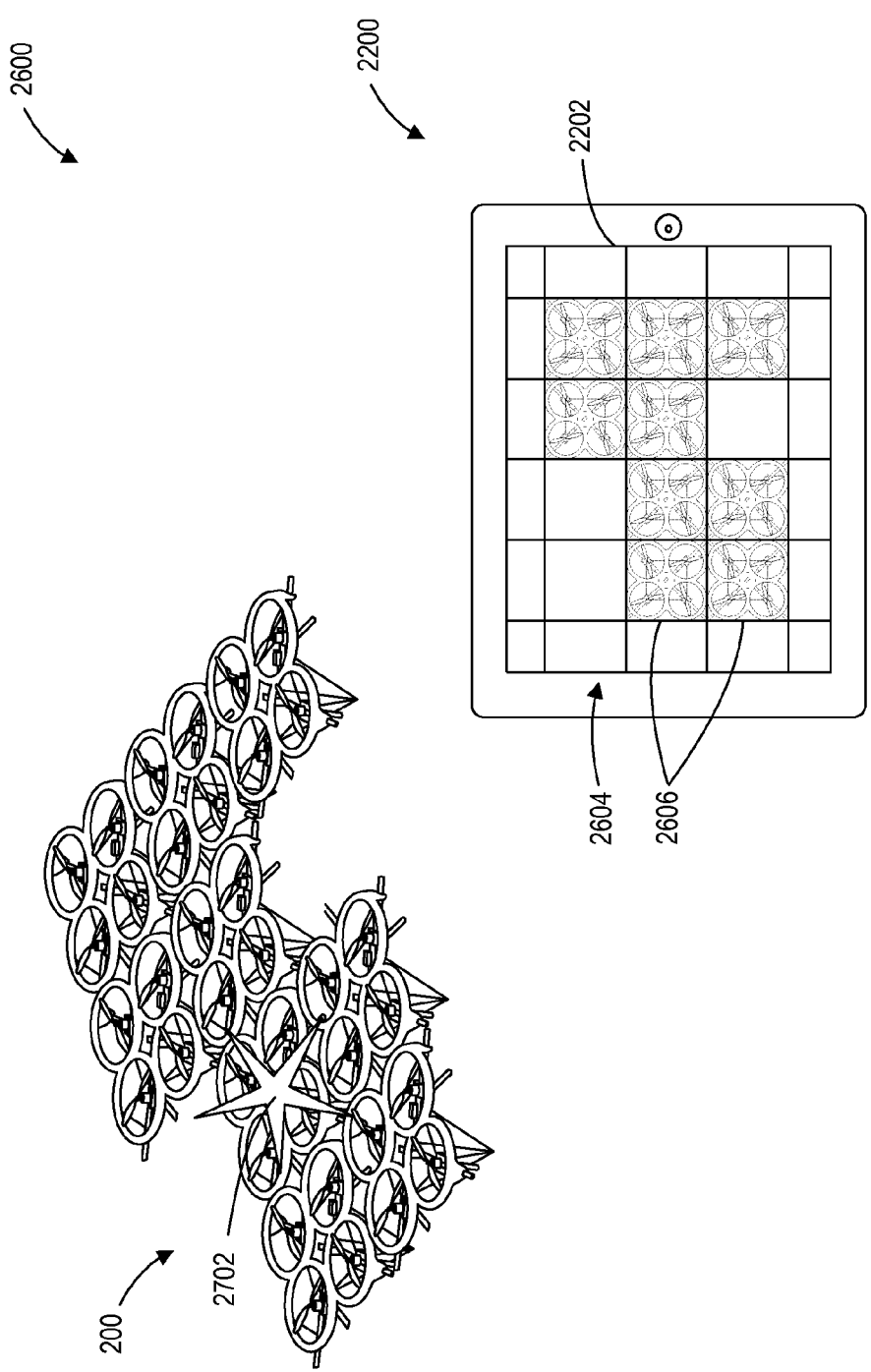

After the applicable characteristics of the payload 130 have been defined, the user may select the define formation control 2206. Using this user control input, the formation of the unified lift vehicle 200 will be defined with respect to the number and placement of individual lift vehicles 100 within the unified lift vehicle 200. FIGS. 26-29 show a modular vehicle lift system 2600 according to various operations in the configuration process. The modular vehicle lift system 2600 includes a unified lift vehicle 200 as described above, as well as the remote control device 2200 with the lift mission application 2204. According to one embodiment, upon selecting the define formation control 2206, the user interface 2202 displays a positioning diagram 2604, as seen in FIG. 26. The positioning diagram 2604 may include any number of potential positions 2606 within a formation of individual lift vehicles 100 that create the unified lift vehicle 200.

According to one embodiment, the user may select the appropriate number and position of the individual lift vehicles 100 corresponding to the desired formation used for the unified lift vehicle 200 by touching the positioning diagram 2604 on the user interface 2202 at the appropriate potential positions 2606. As shown in FIG. 26 and discussed briefly above, the formation of the unified lift vehicle 200 does not have to be symmetric. Rather an asymmetric formation as shown may be beneficial depending on the parameters of the lift mission. For example, the unified lift vehicle 200 may be used to place a piece of equipment on a rooftop that has numerous obstacles projecting from the roof. An asymmetric formation may allow for the unified lift vehicle 200 to position the payload 130 precisely while accommodating the obstacles.

According to another embodiment, the lift mission application 2204 may select or suggest an appropriate formation for the unified lift vehicle 200, including the number and positioning of the individual lift vehicles 100. To do so, the lift mission application 2204 may utilize the payload information input by the user, taking into account the performance capabilities of an individual lift vehicle 100. The lift mission application 2204 may provide multiple formation options, allowing the user to select one for use. Yet another alternative includes the lift mission application 2204 suggesting a formation, while allowing the user to customize the formation as long as the customized formation provides the minimum performance capabilities for the particular lift mission.

Figure 28:
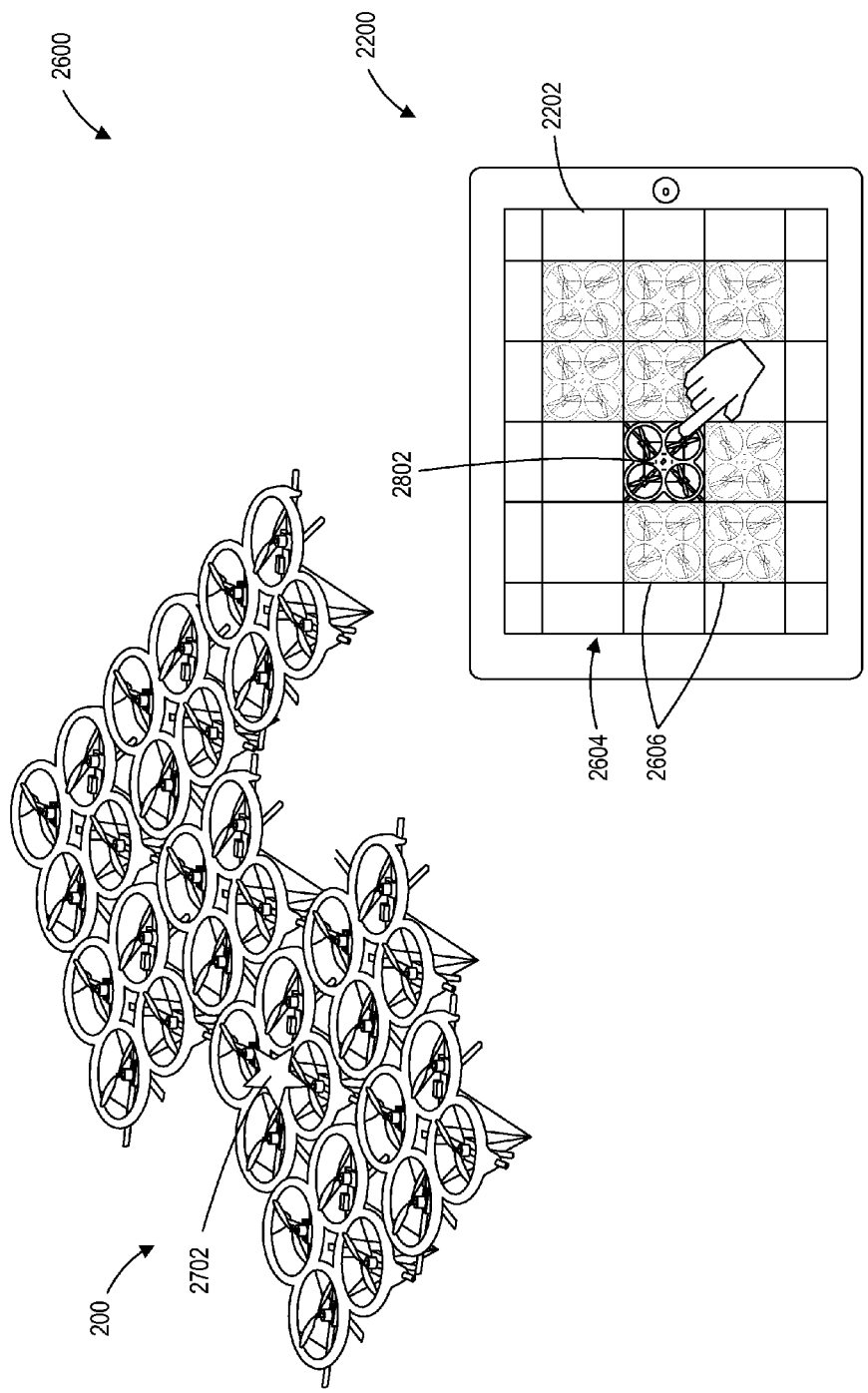

Upon selection of the number and positioning of the individual lift vehicles 100 within the unified lift vehicle 200, the user may assemble the unified lift vehicle 200 using the appropriate connection mechanisms 202 and attach the payload 130. The user may then select a begin registration control 2602 to initiate a registration process used to establish the position of each individual lift vehicle 100 with respect to the other individual lift vehicles 100 of the unified lift vehicle 200. According to one embodiment, the individual lift vehicles 100 recognize other vehicles connected to the circuit 2100 and hold a lottery to cause a single random individual lift vehicle 100 to flash or otherwise identify itself. This notification to the user is indicated by the large star 2702 over one of the individual lift vehicles 100 in FIG. 27. The user selects the corresponding representation of that individual lift vehicle 100 in the formation on the positioning diagram 2604, as shown in FIG. 28. In response, the remote control device 2200 establishes the relative location of the individual lift vehicle 100 with respect to the overall formation. This information is then sent to the controller 140 on the individual lift vehicle 100.

Upon successfully establishing communications with the remote control device 2200, the individual lift vehicle 100 may then provide a registered indicator 2702 to provide the user with a notification that the individual lift vehicle 100 has been successfully registered. The representation of the individual lift vehicle 100 on the positioning diagram 2604 may also change to notify the user that the registration process for that individual lift vehicle 100 is complete. In this example, the representation of the individual lift vehicle 100 on the positioning diagram 2604 changes from broken lines to solid lines, however, any applicable notification may be used within the scope of this disclosure.

Figure 29:
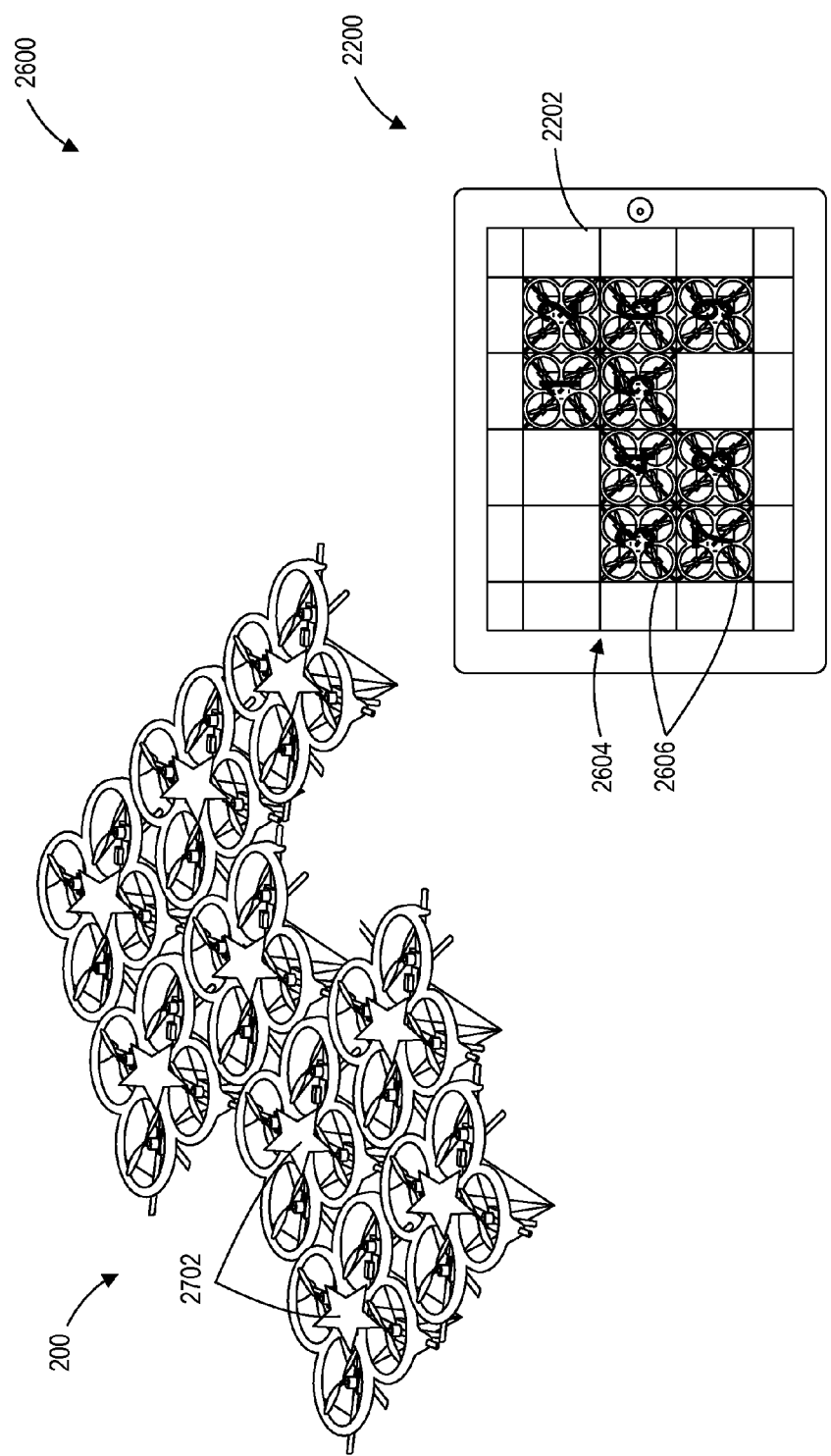

This registration process continues as shown in FIG. 29 until all of the individual lift vehicles 100 have been successfully registered. In this manner, the lift mission application 2204 establishes the position of each individual lift vehicle 100 relative to the other individual lift vehicles 100 of the formation and provides that information to the controllers 140 of the individual lift vehicles 100. Based on this information, the lift mission application 2204 adapts the control instructions for controlling the multiple drive units 102 of an individual lift vehicle 100 for controlled three-axis flight to controlling the multiple individual lift vehicles 100 of the unified lift vehicle 200 for controlled three-axis flight. When registration is complete, each individual lift vehicle 100 is assigned a number as shown in FIG. 29. This number is not only used for control purposes, but also for the purposes of health monitoring as well as notifying the user in the event of an operational inconsistency.

The control of the unified lift vehicle 200 during the lift mission may occur in various manners. First, the remote control device 2200 and corresponding lift mission application 2204 establishes where each individual lift vehicle 100 is located relative to the others during the registration process. Each individual lift vehicle 100 is then assigned its own mode or category based on its positioning as if it were a control surface of an aircraft so that it responds accordingly to commands directed to that control surface. For example, if a roll command is provided by the remote control device 2200, the individual lift vehicles 100 located off to the sides from the center of gravity of the unified lift vehicle 200 will drive all four rotors 104 at a similar rate to initiate the roll. Because the individual lift vehicles 100 know their relative position from the center of gravity, they can calculate from their own inertial measurement units the attitude of the unified lift vehicle 200. A benefit of this control method is that a central computer is not required to capture the state of each individual lift vehicle 100. Alternatively, all vehicle data associated with each individual lift vehicle 100 may be downlinked to the remote control device 2200. The remote control device 2200 may then process the data and send individual control signals to each individual lift vehicle 100.

Figure 30:
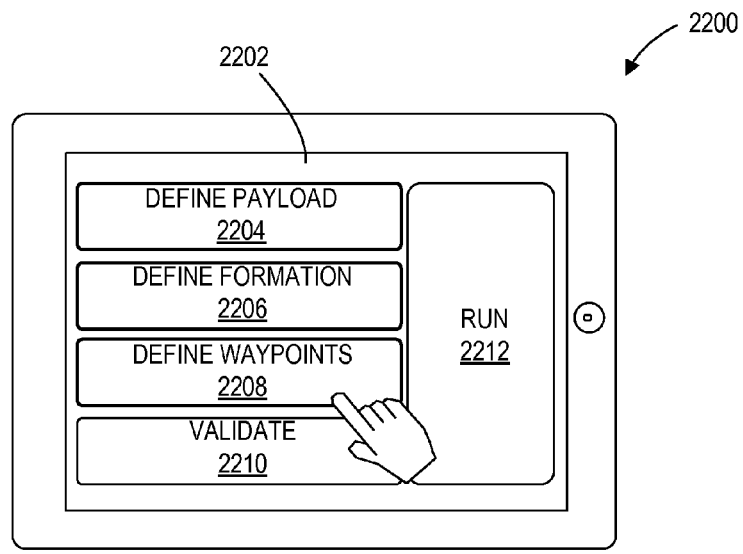
FIG. 30 is a screen diagram of a user interface for a modular vehicle lift system showing the initiation of an example procedure for defining waypoints for a lift mission according to various embodiments presented herein.
Figure 31:
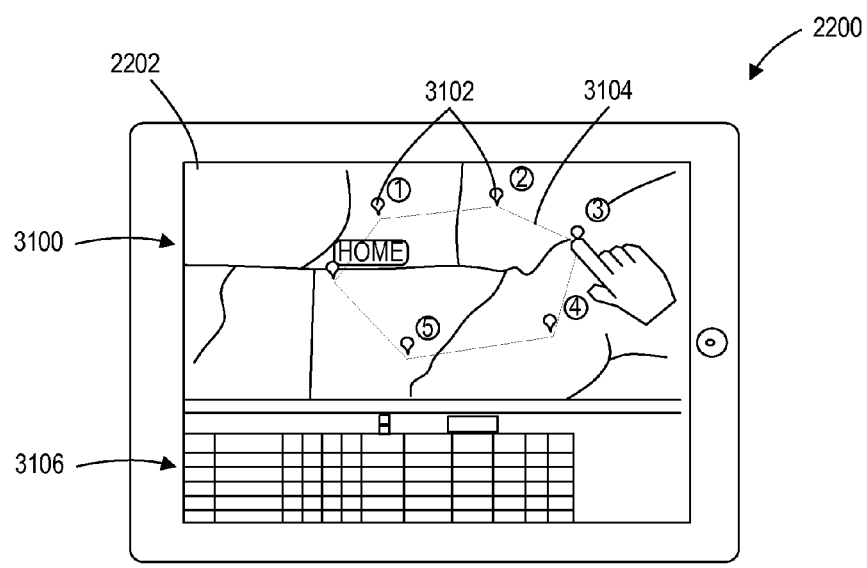
FIG. 31 is a screen diagram of a map interface showing defined waypoints for a lift mission according to various embodiments presented herein.

According to various embodiments, the unified lift vehicle 200 may be controlled autonomously during the lift mission so that user input is not provided, may be controlled manually by the user via controls on the remote control device 220, or a combination of the two. An example lift mission may include autonomous flight from a starting location, through one or more waypoints to a target location at which the user manually flies the unified lift vehicle 200 and attached payload 130 into position. If all or a portion of the lift mission is to be performed autonomously, then the route, including any waypoints, is to be input into the user interface 2202 for use by the lift mission application 2204. FIG. 30 shows the initiation of an example procedure for defining waypoints for a lift mission. After selecting a define waypoints control 2208 on the user interface 2202, the lift mission application 2204 displays a map 3100, as shown in FIG. 31.

The map 3100 may include an overhead view of an area encompassing the lift mission. The user may create and revise waypoints 3102 and the flight route 3104 via a touchscreen of the user interface 2202. Alternatively or additionally, the user may use a keyboard to input the waypoint 3102 information, which is then used by the lift mission application 2204 to display the map 3100 and associated waypoints 3102. According to various embodiments, any quantity and type of lift mission data 3106 may be displayed in textual format in addition to or in place of the map 3100.

Figure 32:
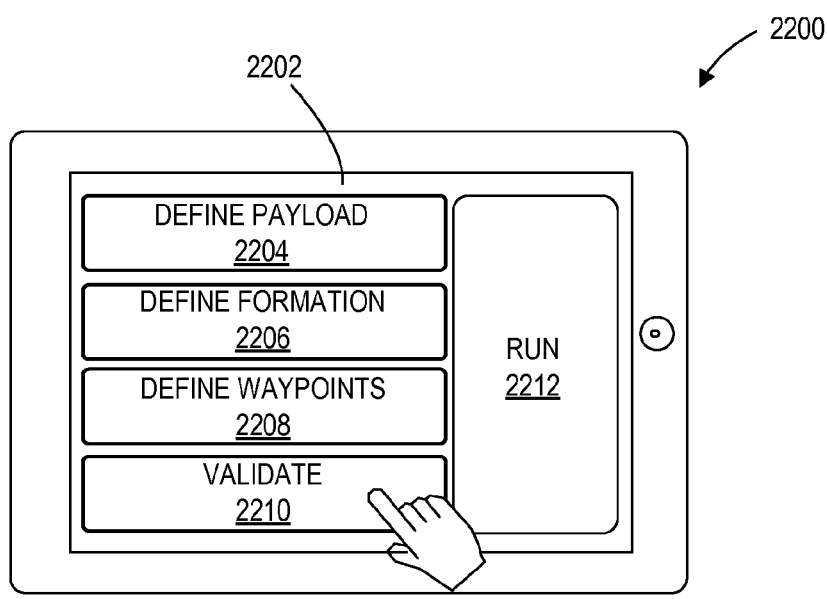
FIG. 32 is a screen diagram of a user interface for a modular vehicle lift system showing the initiation of an example validation procedure according to various embodiments presented herein.
Figure 33:
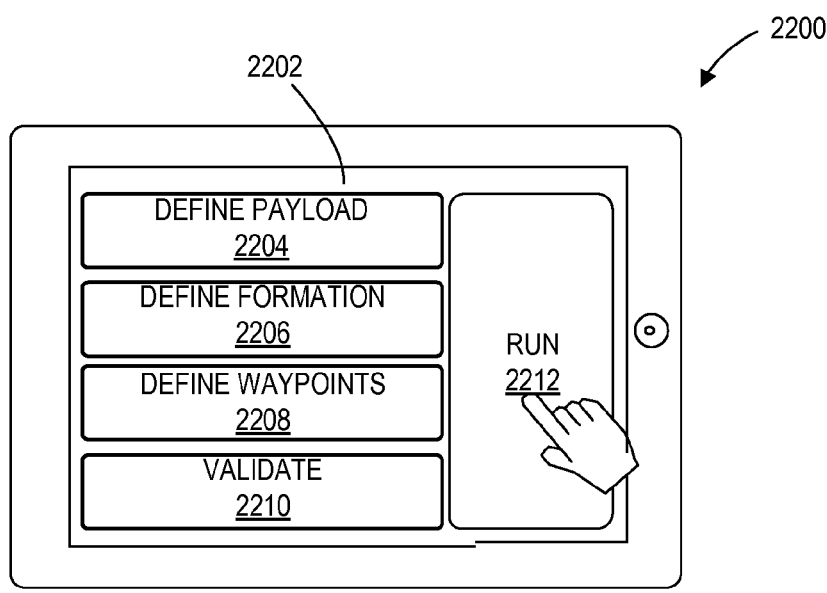
FIG. 33 is a screen diagram of a user interface for a modular vehicle lift system showing the initiation of the lift mission according to various embodiments presented herein.

After the waypoints 3102 have been defined, the user may select the validate control 2210, as shown in FIG. 32. The validate control 2210 initiates a validation process that ensures that the unified lift vehicle 200 has been properly configured and is responding appropriately to flight command input. According to one embodiment, when the validation process begins, the remote control device 2200 will test the communication with all individual lift vehicles 100 and will initiate a test lift of the payload 130. Once the payload 130 has been lifted a predetermined distance, the lift mission application 2204 may validate threshold sensor data from each individual lift vehicle 100 to ensure that each control and sensor suite 118 and each drive unit 102 is functioning within allowed parameters. Any anomalies will be noted. When validation is complete, the user selects the run control 2212 as shown in FIG. 33 and the lift mission commences and proceeds as programmed.

Figure 34:
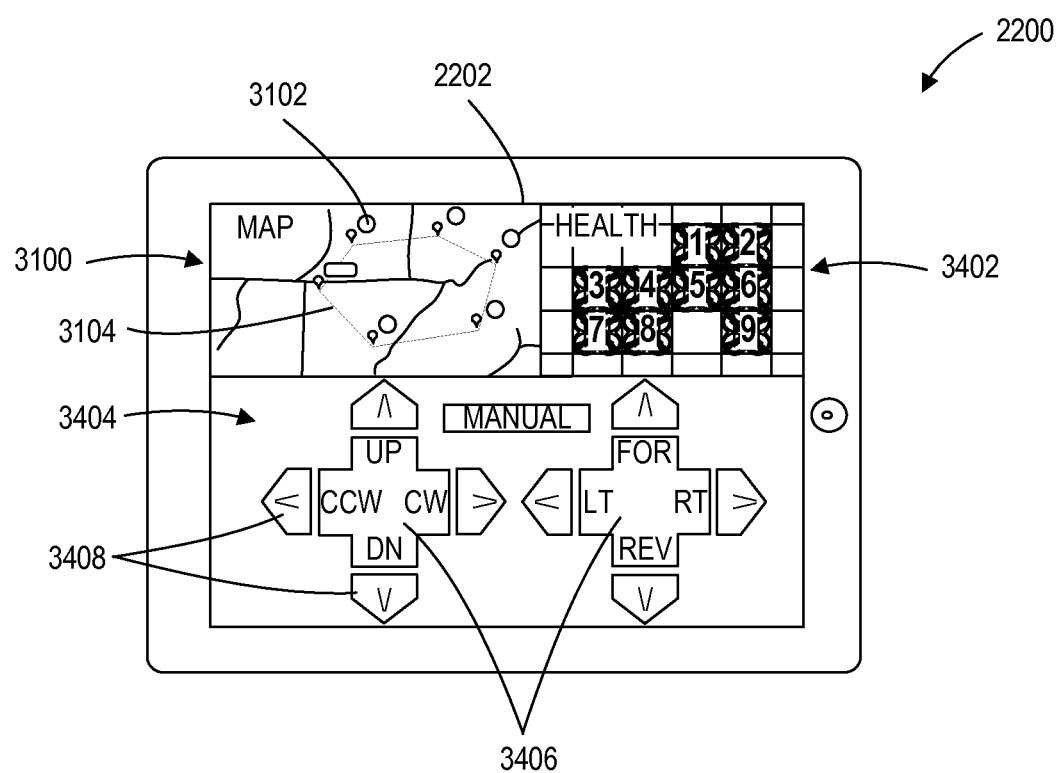
FIG. 34 is a screen diagram of a user interface for a modular vehicle lift system showing example controls for manual operation of the unified lift vehicle according to various embodiments presented herein.

If all or any portion of the lift mission is to be flown manually, the remote control device 2200 may provide a user interface 2202 having manual controls 3402, as seen in FIG. 34. According to this example, the user interface 2202 may include any number and type of information or control areas, including but not limited to, the map 3100, a health monitor 3402, and manual controls 3404. The map 3100 may show an overhead view of an area encompassing the lift mission, including the waypoints 3102 and the flight route 3104 defined during the configuration process described above. The map 3100 may additionally highlight or otherwise identify the current location of the unified lift vehicle 200 on the flight route 3104 in real time during the lift mission.

The health monitor 3402 may provide a representation of the unified lift vehicle 200, including the assigned numbers of each individual lift vehicle 100 within the formation. If an operational inconsistency is detected with respect to an individual lift vehicle 100 during the lift mission, notification may be provided to the user by the health monitor 3402. Notification may take the form of a flashing number associated with the individual lift vehicle 100, a change in color of the individual lift vehicle 100 or corresponding number, or any other suitable visual and/or audible notification mechanism.

The manual controls 3404 may include primary controls 3406 and precision controls 3408, according to one embodiment. Using the primary controls 3406, a user may command the unified lift vehicle 200 to perform a counter clockwise rotation (CCW), a clockwise rotation (CW), to move up, down, left, right, forward, and reverse. These commands may occur sequentially or simultaneously. The precision controls 3408 may be used to "nudge" the unified lift vehicle 200, or provide substantially minor control input, according to the adjacent primary control 3406 command. For example, to provide a very minor altitude correction and nudge the unified lift vehicle 200 downward slightly during payload delivery, the user may press the precision control 3408 adjacent to the down control of the primary controls 3408.

Figure 35:
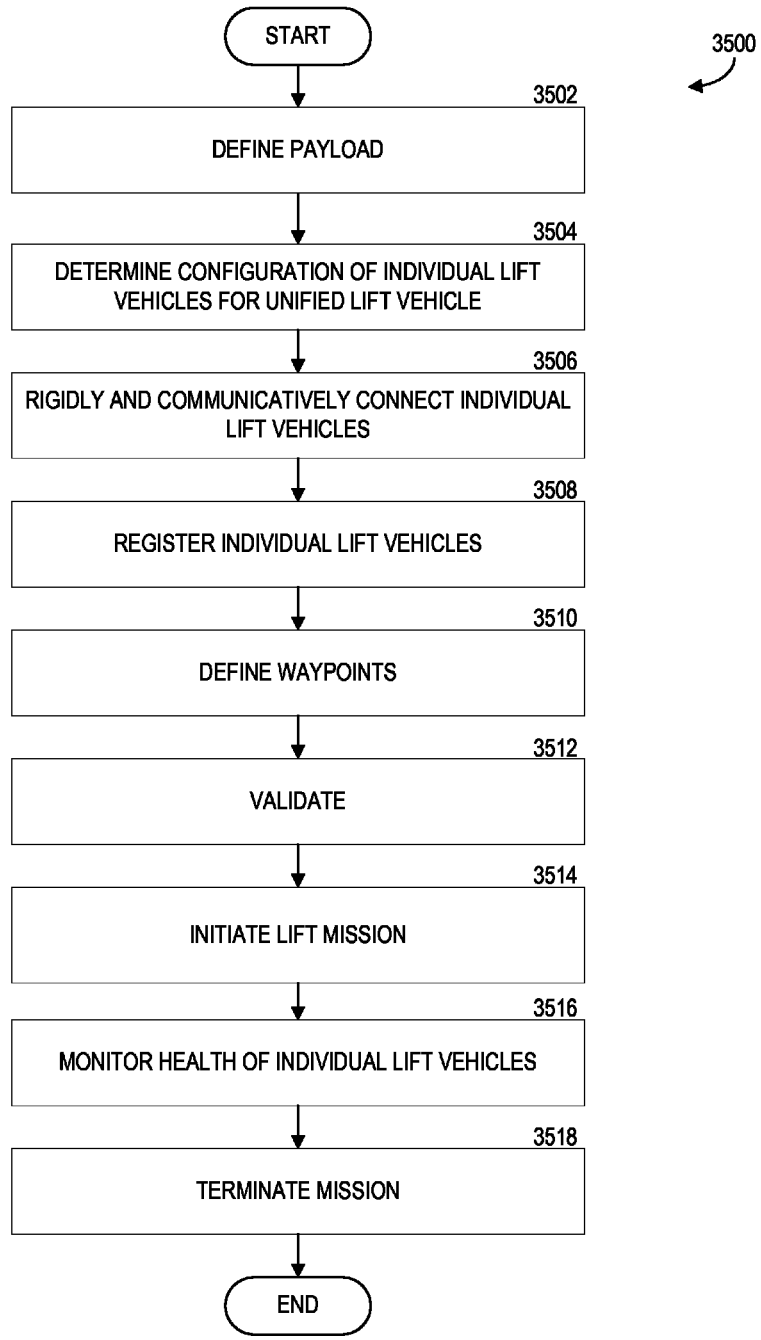
FIG. 35 is a flow diagram showing a method of maneuvering a payload according to various embodiments presented herein.

Turning now to FIG. 35, additional details will be provided regarding embodiments presented herein for maneuvering a payload 130 utilizing a modular vehicle lift system 2600. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 35 shows a routine 3500 for maneuvering a payload 130 utilizing a modular vehicle lift system 2600. The routine 3500 begins at operation 3502, where the payload 130 is defined. As discussed above, the user may input various characteristics of the payload 130 into the user interface 2202 provided by the lift mission application 2204. These characteristics may include, but are not limited to, dimensions 2406, weight 2408, center of gravity 2404, and attachment positions 2402. The representation of the payload 130 on the user interface 2202 may be rectangular in shape and may allow the user to select different views or rotate the view to input additional attachment positions 2402 or dimensions 2406. According to various embodiments, additional shapes corresponding to the payload 130 may be pre-programmed and selected, or the shape may be customizable.

When the payload 130 has been defined in the remote control device 2200, the routine 3500 continues to operation 3504, where the formation of individual lift vehicles 100 within the unified lift vehicle 200 is determined. Based at least in part on the characteristics of the payload 130 being lifted and maneuvered, the lift mission application 2204 may suggest one or more formations for the unified lift vehicle 200, including number and positioning of the individual lift vehicles 100. From operation 3504, the routine 3400 continues to operation 3506, where the individual lift vehicles 100 are rigidly and communicatively connected using the appropriate connection mechanisms 202. According to one embodiment, edge connectors 1500 may be used to join two adjacent connection junctions 110 of two individual lift vehicles 100, while central connectors 1800 may be used to join four connection junctions 110 associated with four individual lift vehicles 100. Each connection mechanism 202 may have a top half (1504,1804) and an identical bottom half (1506,1806). The top and bottom halves are assembled to sandwich the corresponding connection junctions 110 of the individual lift vehicles 100, completing the circuits 2100 and rigidly connecting the individual lift vehicles 100 to create the unified lift vehicle 200.

At operation 3508, the individual lift vehicles 100 are registered. The registration process provides the lift mission application 2204 with positioning information for each individual lift vehicle 100, as well as providing the individual lift vehicles 100 with their positions respective to others in the unified lift vehicle 200. The routine 3500 continues from operation 3508 to operation 3510, where the waypoints 3102 are defined. During this process, the user may textually input the locations of the waypoints 3102, may use a touchscreen interface to identify the waypoints 3102 on a map 3100, or may input the waypoints 3102 in any other available means. Alternatively, the user may remotely control the lift mission manually without providing any waypoint information. With the waypoints 3102 and corresponding flight route 3104 identified, the routine 3500 continues to operation 3512, where the lift mission application 2204 validates the formation and controls.

As described above, the validation process tests the communications between the individual lift vehicles 100, as well as between the unified lift vehicle 200 and the remote control device 2200. The control inputs from the remote control device 2200 to the unified lift vehicle 200 are additionally tested, as is the ability to lift and maneuver with the payload 130.

When the validation is complete, the routine 3500 proceeds to operation 3514, where the lift mission is initiated. The user may press the run control 2212 to initiate the mission. If autonomous flight is planned, the unified lift vehicle 200 will fly the designated flight route 3104 via waypoints 3102. At any time during the mission, or at a designated waypoint 3102, the user may manually override the autonomous flight operation and manually control the unified lift vehicle 200 via the manual controls 3404 on the remote control device 2200.

At operation 3516, the health or operational status of the individual lift vehicles 100 is monitored. The health may be monitored by the control and sensor suite 118 of each individual lift vehicle 100 during all phases of the lift mission. If an operational inconsistency is detected, notification is provided to the lift mission application 2204 and provided to the user via the user interface 2202. At operation 3518, when the lift mission is complete, the lift mission application 2204 or the user shuts down the drive units 102 of the individual lift vehicles 100 and the mission is terminated.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A unified lift vehicle for maneuvering a payload, comprising:
    a plurality of individual lift vehicles, each individual lift vehicle operative to perform controlled three-axis flight separately from other individual lift vehicles; and
    a plurality of connection mechanisms rigidly and communicatively connecting the plurality of individual lift vehicles in a lifting array formation to create the unified lift vehicle operative to perform three-axis flight, each connection mechanism comprising either a wall-positioned connector configured to mate with an outer surface of a connector junction of an individual lift vehicle or an end connector configured to mate with an end of the connector junction of the individual lift vehicle.

2. The unified lift vehicle of claim 1, further comprising a controller operative to receive control data from a remote control device and to control an individual lift vehicle according to the control data.

3. The unified lift vehicle of claim 1, wherein each individual lift vehicle comprises:
    four drive units rigidly coupled to one another to create a four-rotor configuration, each drive unit comprising a motor and a rotor coupled to the motor, wherein each individual lift vehicle comprises only four drive units such that four rotors provide all thrust for the individual lift vehicle;
    a power source coupled to the four drive units; and
    a controller communicatively coupled to the four drive units and operative to
        receive control data, and
        to control each of the four drive units according to the control data.

4. The unified lift vehicle of claim 3, wherein the four drive units are rigidly coupled to one another in a 2×2 configuration via a frame extending outward from a hub centrally located within the individual lift vehicle between the four drive units.

5. The unified lift vehicle of claim 1, further comprising a speed controller communicatively coupled to each motor and to the controller and operative to receive control data from the controller and alter the speed of the motor according to the control data.

6. The unified lift vehicle of claim 1, further comprising a control and sensor suite operative to autonomously control the unified lift vehicle and a payload along a flight route via at least one waypoint.

7. The unified lift vehicle of claim 1, further comprising a circuit communicatively coupling the plurality of individual lift vehicles via the plurality of connection mechanisms.

8. The unified lift vehicle of claim 1, wherein each connection mechanism comprises a top half and a bottom half that are identical and interchangeable.

9. The unified lift vehicle of claim 8, wherein each connection mechanism comprises a plurality of connection apertures defined by the top half and the bottom half when joined together, each connection aperture sized and shaped to receive the connector junction of one individual lift vehicle.

10. The unified lift vehicle of claim 9, wherein the top half and the bottom half each comprise a signal transfer line extending between the plurality of connection apertures and configured to transfer electrical or data signals between adjacent individual lift vehicles.

11. The unified lift vehicle of claim 10, wherein the top half and the bottom half each comprise the wall-positioned connector configured to mate with a corresponding connector at the outer surface of the connector junction of the individual lift vehicle and to communicatively couple the signal transfer line to a distribution line of the individual lift vehicle.

12. The unified lift vehicle of claim 10, wherein the top half and the bottom half each comprise the end connector configured to mate with a corresponding connector at the end of the connector junction of the individual lift vehicle and to communicatively couple the signal transfer line to a distribution line of the individual lift vehicle.

13. The unified lift vehicle of claim 8, wherein the plurality of connection mechanisms comprise a plurality of edge connectors and a central connector, wherein each edge connector is configured to rigidly and communicatively connect two adjacent individual lift vehicles and wherein the central connector is configured to rigidly and communicatively connect more than two adjacent individual lift vehicles.

14. A modular vehicle lift system, comprising:
    a plurality of individual lift vehicles positioned adjacent to one another according to a lifting array formation, each individual lift vehicle operative to perform controlled three-axis flight separately from other individual lift vehicles and comprising:
        four drive units rigidly coupled to one another to create a four-rotor configuration, each drive unit comprising a motor and a rotor coupled to the motor, wherein each individual lift vehicle comprises only four drive units such that the four drive units provide all thrust for the individual lift vehicle, and
        a controller communicatively coupled to the four drive units and operative to receive control data from a remote control device and to control each of the four drive units according to the control data;
    a plurality of connection mechanisms rigidly and communicatively connecting the plurality of individual lift vehicles in the lifting array formation to create a unified lift vehicle operative to perform three-axis flight, each connection mechanism comprising either a wall-positioned connector configured to mate with an outer surface of a connector junction of an individual lift vehicle or an end connector configured to mate with an end of the connector junction of the individual lift vehicle; and the remote control device operative to provide the control data to the controller of each individual lift vehicle and control the unified lift vehicle in three-axis flight.

15. The modular vehicle lift system of claim 14, wherein each connection mechanism comprises a top half and a bottom half that are identical and interchangeable.

16. The modular vehicle lift system of claim 15, wherein the top half and the bottom half each comprise a signal transfer line extending between the plurality of connection apertures and configured to transfer electrical or data signals between adjacent individual lift vehicles.

17. The modular vehicle lift system of claim 16, wherein the plurality of connection mechanisms comprise a plurality of edge connectors and a central connector, wherein each edge connector is configured to rigidly and communicatively connect two adjacent individual lift vehicles and wherein the central connector is configured to rigidly and communicatively connect more than two adjacent individual lift vehicles.

18. A method for maneuvering a payload utilizing a modular vehicle lift system, the method comprising:

rigidly and communicatively coupling a plurality of individual lift vehicles with a plurality of connection mechanisms via either a wall-positioned connector of each connection mechanism configured to mate with an outer surface of a connector junction of an individual lift vehicle or an end connector of each connection mechanism configured to mate with an end of the connector junction of the individual lift vehicle to create a unified lift vehicle, wherein each individual lift vehicle is operative to perform controlled three-axis flight separately from other individual lift vehicles;

coupling the payload to the unified lift vehicle; and providing flight commands to the unified lift vehicle to maneuver the payload in three-axis flight.

19. The method of claim 18, wherein for each adjoining pair of individual lift vehicles to be connected, rigidly and communicatively coupling the plurality of individual lift vehicles with the plurality of connection mechanisms comprises:

positioning a connection junction of a first individual lift vehicle within a first connection aperture of a first half of a connection mechanism;

positioning a connection junction of a second individual lift vehicle within a second connection aperture of the first half of the connection mechanism;

placing a second half of the connection mechanism over the first half; and securing the first half to the second half.

20. The method of claim 19, further comprising:

communicatively coupling the connection junction of the first individual lift vehicle to a signal transfer line of the connection mechanism when positioning the connection junction within the first connection aperture; and communicatively coupling the connection junction of the second individual lift vehicle to the signal transfer line of the connection mechanism when positioning the connection junction within the first connection aperture.

21. The method of claim 18, further comprising:

determining a formation of the individual lift vehicles for the unified lift vehicle;

registering the individual lift vehicles to identify a position of each individual lift vehicle within the formation; and identifying a plurality of individual lift vehicles for control according to the position of the identified lift vehicles and the flight commands, wherein providing flight commands to the unified lift vehicle comprises providing the flight commands to the plurality of individual lift vehicles identified for control.

22. The method of claim 21, further comprising defining characteristics of the payload within a remote control device, wherein determining the formation of the individual lift vehicles for the unified lift vehicle comprises determining the number and positioning of the individual lift vehicles within the unified lift vehicle according to the characteristics of the payload and performance capabilities of each individual lift vehicle.

23. The method of claim 18, further comprising defining waypoints and a flight route within a remote control device, wherein providing flight commands to the unified lift vehicle to maneuver the payload in three-axis flight comprises initiating autonomous flight according to the waypoints and the flight route.

* * * * *